(12) United States Patent
Parker et al.

(10) Patent No.: US 8,184,972 B2
(45) Date of Patent: May 22, 2012

(54) METHOD AND APPARATUS RELATING TO SECURE COMMUNICATION

(75) Inventors: Michael Charles Parker, Essex (GB); Stuart Douglas Walker, Essex (GB)

(73) Assignee: Fujitsu Limited, Kawasaki (JP)

( * ) Notice: Subject to any disclaimer, the term of this patent is extended or adjusted under 35 U.S.C. 154(b) by 971 days.

(21) Appl. No.: 12/219,630

(22) Filed: Jul. 24, 2008

(65) Prior Publication Data

US 2009/0028332 A1     Jan. 29, 2009

(30) Foreign Application Priority Data

Jul. 25, 2007    (GB) .................................. 0714519.6

(51) Int. Cl.
*H04B 10/00*      (2006.01)

(52) U.S. Cl. ............ 398/40; 398/140; 398/39; 398/183; 398/188; 398/202; 398/207; 398/212; 398/213; 398/214; 398/201; 380/44; 380/255; 380/256; 380/31; 380/21

(58) Field of Classification Search .................... 398/40, 398/140, 141, 39, 152, 182, 183, 188, 118, 398/119, 159, 162, 164, 185, 186, 192, 200, 398/201, 202, 207, 208, 209, 212, 213, 214, 398/77, 78, 135, 138, 139; 380/31, 21, 9, 380/44, 255, 256, 278, 286

See application file for complete search history.

(56) References Cited

U.S. PATENT DOCUMENTS

| | | | |
|---|---|---|---|
| 5,864,625 A | * | 1/1999 | Rutledge ......................... 380/31 |
| 6,947,193 B1 | | 9/2005 | Dultz et al. |
| 7,822,342 B1 | * | 10/2010 | Roberts et al. .................. 398/40 |

FOREIGN PATENT DOCUMENTS

JP     2004-64513     2/2004

OTHER PUBLICATIONS

Padgett, M J and Courtial, J, "Poincar -sphere equivalent for light beams containing orbital angular momentum", Optical Society of America, Optics Letters, vol. 24, No. 7, Apr. 1, 1999, pp. 430-432.

(Continued)

*Primary Examiner* — Hanh Phan
(74) *Attorney, Agent, or Firm* — Staas & Halsey LLP

(57) ABSTRACT

Data is encrypted onto an electromagnetic beam by providing an electromagnetic beam having a signal component having a modal state, wherein the signal component is susceptible to accumulation of a geometric phase, and a reference component, transmitted along a path over at least part of which the signal component accumulates a geometric phase by transformation of its modal state from a first to a second modal state, from the second to at least one further modal state, and then back to the first modal state; and modulating with the data the geometric phase so accumulated, by modulating the modal state transformations. Data is decrypted from a received electromagnetic beam by corresponding processing of the received electromagnetic beam and by comparing an overall phase of the signal component with an overall phase of the reference component so as to retrieve the modulation.

37 Claims, 14 Drawing Sheets

OTHER PUBLICATIONS

Calvo, G.F., "Wigner representation and geometric transformations of optical orbital angular momentum spatial modes", Optical Society of America, Optics Letters, vol. 30, No. 10, May 15, 2005, pp. 1207-1209.

Wikipedia entry "BB84" —Apr. 17, 2007.

E. J. Galvez, et al., "Geometric Phase Associated with Mode Transformations of Optical Beams Bearing Orbital Angular Momentum", *Physical Review Letters*, vol. 90, No. 20, May 23, 2003, pp. 203901-1 to 203901-4.

Hiroyuki Sasada, et al., "Transverse-mode beam splitter of a light beam and its application to quantum cryptography", *Physical Review A68* (2003), pp. 012323-1 to 012323-7.

Joseph M. Renes, et al., "Frames, Designs, and Spherical Codes in Quantum Information Theory", *Ph.D. Thesis, The University of New Mexico*, Apr. 2004, (Downloaded from <http://info.phys.unm.edu/papers/PhD/Renes.pdf> on Nov. 21, 2007), pp. 140-152.

E.J. Galvez, et al., "Geometric Phase Associated with Mode Transformations of Optical Beams Bearing Orbital Angular Momentum", The American Physical Society, vol. 90, No. 20, May 23, 2003.

Federico M. Spedalieri, "Quantum key distribution without reference frame alignment: Exploiting photon orbital angular momentum", Science Direct, Optics Communications, 260, 2006, pp. 340-346.

Wu Jing-Zhi, et al., "Light beams with orbital angular momentum for free space optics", Chinese Physics, vol. 16, No. 5, May 2007, pp. 1334-1338.

Graham Gibson, et al., "Free-space information transfer using light beams carrying orbital angular momentum", Optics Express, vol. 12, No. 22, Nov. 1, 2004.

L. Marrucci, et al., "Pancharatnam-Berry phase optical elements for wave front shaping in the visible domain: Switchable helical mode generation", Applied Physics Letters, vol. 88, 2006.

European Search Report issued on Nov. 7, 2008 in corresponding European Patent Application No. 08013135.2.

* cited by examiner

METHOD AND APPARATUS RELATING TO SECURE COMMUNICATION

FIELD OF THE INVENTION

This invention relates to secure communication. More particularly, the present invention relates to encryption of data onto an electromagnetic beam.

BACKGROUND ART

Secure transmission of data is becoming increasingly important in society. Personal data, commercial & financial information and cryptographic keys themselves are transmitted between different locations, and it is desirable for there to be minimal (or preferably no) risk of interception. Various encryption schemes have been proposed to protect transmitted data.

An example of such a scheme is quantum cryptography, which in principle can provide completely secure transmission. Whereas most recent encryption methods rely on the difficulty of computing certain mathematical functions, quantum cryptography is based on physical phenomena. The usual goal of quantum cryptography is to share a random data string, for use as a key in the encryption (and decryption) of sensitive messages; the encryption itself is usually carried out using a suitable algorithm. The encrypted message may then safely be transmitted over an open (non-secure) communications channel.

Quantum theory tells us that measurement of an observable in a system will disturb the system, in particular where two observables are described by non-commuting operators. An example of two such observables are the polarisation states of a photon, for example, on the one hand, the vertical/horizontal states, and, on the other hand, the 45 degree/135 degree diagonal states. Quantum systems can be entangled, whereby the quantum states of two or more objects are linked, and remain linked even when the objects are separated from each other, even by considerable distances.

Those phenomena enable the construction of quantum communication systems that detect any attempt at eavesdropping, and, by rejecting any data contaminated by eavesdropping, allow the transmission of a key under demonstrably secure conditions. Thus, in one class of quantum encryption systems, photon polarisation is used to construct the key, and bits contaminated by eavesdropping are rejected.

In another class, entangled photons are used. One of an entangled pair of photons is transmitted to a receiver. Measurements are performed on the entangled photons, at the transmitter and receiver ends of the system, and the results of those experiments are used to construct a secure key.

However, at present, quantum cryptography suffers from many limitations, such as distance (due to a need for transmission of single photons), low bit rate, susceptibility to jamming, and the considerable difficulty of implementing practical, working systems.

Another field of research that utilises quantum mechanical effects is the field of quantum computing. In quantum computing, the phenomena of quantum physics, such as entanglement, are used to perform operations on data. A drawback of using the polarisation of light for quantum computation is that the polarisation of light is only suitable for single-bit computation, i.e. any polarisation state of light can be described as a superposition of two orthogonal polarisation states. E. J. Galvez et al. describe (in "Geometric phase associated with mode transformation of optical beams bearing orbital angular momentum", *Physical Review Letters*, 90(20), 203901, 2003) a device for use in N-bit quantum computation.

To understand the operation of the Galvez device, one should first consider a Poincaré Sphere in Stokes space (FIG. 1). Conventionally, such a Poincaré Sphere is used to represent the state of polarisation of a beam of light.

In 3D Stokes space, polarisation is described by three mutually orthogonal co-ordinates, $S_1$, $S_2$ and $S_3$, which form the three Stokes vectors. Any polarisation can be expressed as a combination of the three Stokes vectors. For a completely polarised signal or light beam, the intensity of the light $S_0$ is given by the expression $S_0^2 = S_1^2 + S_2^2 + S_3^2$, which for constant intensity is the equation of a sphere; hence, the possible polarisations of a constant intensity light beam form the locus of the surface of a sphere in Stokes space.

Polarisation is equivalent to quantum mechanical spin, and so has dimensions of angular momentum; hence M. J. Padgett and J. Courtial teach (in "Poincaré-sphere equivalent for light beams containing orbital angular momentum", *Optics Letters*, 24(7), p430, 1999) that the Poincaré sphere can also be used to represent the states of orbital angular momentum of a light beam, which form a set of modes analogous to that of polarisation.

The higher-order Hermite-Gaussian (HG) and Laguerre-Gaussian (LG) modes are represented on Poincaré sphere 20 of FIG. 2. The HG modes are analogous to linear polarisations and lie on the equator of the Poincaré Sphere, whilst the two LG modes (analogous to circular polarisations) lie at the poles of the Poincaré Sphere.

For modes or groups obeying the symmetries of the Poincaré Sphere, closed contour paths (that is, a set of transformation operations taking the mode or group away from and back to an initial state) on the surface of the Poincaré Sphere result in a geometrical phase, given by the solid angle subtended by the closed contour path at the centre of the sphere. That geometric phase effect is a phase accumulation due to topological effects. Modes or groups which do not exhibit the appropriate symmetries do not acquire a geometric phase when undergoing the same set of transformation operations.

The solid angle subtended by a closed contour is given by a double integral over the azimuthal angle $2\theta$ and the elevation angle $\phi$ (FIG. 2) [NB: the azimuthal angle $\theta$ in real space is transformed to $2\theta$ in Stokes space.

A closed contour path A-B-C is shown on the Poincaré Sphere 20 of FIG. 2. The starting position is the south pole, the mode $LG_0^{+1}$. In a first transformation, the elevation angle $\phi$ is increased by $\pi/2$ so that the mode traverses the path A to lie on the equator and (for convenience of explanation—the precise HG mode is arbitrary) becomes the mode $HG_{01}$. Next, in a second transformation, the azimuthal angle in real space is rotated by $\theta$ (corresponding to $2\theta$ on the Poincaré Sphere) so that the mode, whilst still lying on the equator, traverses the locus B and becomes in general a mixed state of $HG_{01}$ and $HG_{10}$ modes, i.e. $HG_{01} \cos\theta + HG_{10} \sin\theta$. Finally, the elevation angle $\phi$ is reduced, by $-\pi/2$, so that the mode follows the path C, reaching the south pole again, and has completed a closed contour locus whilst acquiring an associated geometric phase $\Omega$.

FIG. 3 (which is essentially the Galvez quantum-computing device) indicates how such azimuthal and elevation angles changes may be achieved in practice. The device can be considered to be made up of three portions, a portion 30 for generating the orbital-angular-momentum modes, a portion 40 for adding the geometric phase, and a portion 50 for detecting the added geometric phase.

The portion 40 for adding geometric phase is made up from (FIG. 4) a first pair of cylindrical lenses 60 with parallel axes, first and second Dove prisms 70, 80, and a second pair of parallel cylindrical lenses. All of the components are mounted on a common optical axis 100, so that light passes through each of them in sequence. The cylindrical lenses 60, 90 are mounted on actuated rotation stages, so that they may each be rotated through an angle about the optical axis 100. The first Dove prism 70 is mounted on an actuated rotation stage, so that it may be rotated through an angle θ/2 about an axis perpendicular to the optic axis 100.

Axial rotation of the first pair of cylindrical lenses 60 by an angle π/4 causes the required π/2 phase change in the elevation angle φ, and converts between LG and HG modes. Axial rotation of the second pair of cylindrical lenses 90 converts the modes back again. The first Dove prism is axially orientated at an angle θ/2 with respect to the second Dove prism, so as to spatially rotate the mode by an angle θ [NB: as previously discussed, this causes an angle 2θ in the associated Stokes Space].

FIG. 5 shows how the multiplexing of the two modes of light is achieved: the first mode which experiences the geometric phase modulations, and the second mode which does not undergo any geometric phase changes. The portion 30 for generating the orbital-angular-momentum modes is made up from a computer generated hologram (CGH) exhibiting a single phase line dislocation (FIG. 5(b)—essentially a phase singularity at its centre), a pair of beamsplitters BS1, BS2, a pair of mirrors M1 and M2, and a pair of iris stops.

The CGH is placed before a collimated lowest-order Gaussian beam of light, i.e. a $LG_0^0$ mode. The CGH acts to diffract the light into multiple orders. The $0^{th}$-order (undiffracted) light is the same as the incident beam and remains a lowest order $LG_0^0$ mode of light. The first-order diffracted light modes are the $LG_0^{+1}$ and $LG_0^{-1}$ modes, constituting the $+1^{st}$ and $-1^{st}$ orders respectively. The diffracted orders are passed into a power beam splitting cube BS1, and the desired orders in each of the consequent two optical paths are selected by spatial filtering, i.e. by means of an iris stop in each path. The $0^{th}$-order light is allowed through in the first path (reflecting from mirror M1); whilst only the $+1^{st}$-order diffracted light is allowed through in the second path (reflecting from mirror M2). The two spatially filtered beams are reflected respectively by mirrors M1 and M2 onto a second power beam splitting cube BS2, which acts to combine the two selected modes, $LG_0^0$ and $LG_0^{+1}$ together. The two modes then pass to the portion 40 for adding geometric phase (FIG. 4). The $LG_0^0$ mode experiences no geometrical phase modulation here, whereas the higher OAM mode $LG_0^{+1}$ is geometrically phase modulated as described above.

As described in the Galvez paper, the geometric phase is detected (in the portion 50 for detecting the added geometric phase) by directly imaging onto a CCD camera the output from the portion 40 for adding geometric phase, and noting the relative rotation of the interference pattern resulting from the superposition of the $LG_0^0$ and $LG_0^{+1}$ modes.

The present invention seeks to provide an encryption method and apparatus in which at least some of the above-mentioned problems with prior-art encryption systems are ameliorated.

DISCLOSURE OF THE INVENTION

In a first aspect, the invention provides a method of encrypting data onto an electromagnetic beam, comprising: providing an electromagnetic beam having a signal component having a modal state, wherein the signal component is susceptible to accumulation of a geometric phase, and a reference component; transmitting the beam along a path over at least part of which the signal component accumulates a geometric phase by transformation of its modal state from a first modal state to a second modal state, from the second modal state to at least one further modal state, and then back to the first modal state; and modulating with the data the geometric phase so accumulated, by modulating the modal state transformations.

The electromagnetic beam may be for example a beam of light, an infrared beam, a microwave beam or a millimeter-wave beam.

At least part of the geometric phase may be accumulated at a transmitter; that is, at least some of the modal state transformations may be performed at a transmitter. At least part of the geometric phase may be accumulated at a receiver. It may be that part of the geometric phase is accumulated at a transmitter and part of the geometric phase is accumulated at a receiver. It may be that all of the geometric phase is accumulated at the transmitter and the receiver (i.e., that none of the geometric phase is accumulated anywhere else, e.g. that none of the geometric phase is accumulated during propagation between the transmitter and the receiver).

As will be clear from the examples described herein of specific embodiments of the invention, it may be that the "transmitter" and the "receiver" in a sense swap roles at different stages of the method. For example, in some example embodiments, a secure communication channel is established between two people, referred to for convenience as "Alice" and "Bob". Alice may ultimately be the person who transmits a message over the channel to Bob, but it may be Bob who initiates transmission of the beam that acquires the geometric phase. Thus, Bob may transmit a beam to Alice, who may return it to Bob, and the geometric phase may be acquired in Bob's apparatus, in Alice's apparatus, or partially in Bob's apparatus and partially in Alice's apparatus. Either Alice or Bob may modulate the beam in order to encode a key in the geometric phase of the signal component; either Bob or Alice (i.e. the other person) may then extract the key by extracting the phase modulation from the beam. Both Alice and Bob will then have the key, and so either may then begin transmission of a confidential message, using the key to encrypt the message. Thus during that example method, both Alice and Bob have used their apparatus as both a transmitter and a receiver. The skilled person will generally understand, in a given specific context, whether apparatus is being used as a transmitter, a receiver, or both.

The modulation may take place before the beam has completed propagation along the path. It may be that the modulated geometric phase acquired by the signal component only becomes measurable after the beam has completed propagation along the path. Thus, for example, the modulation may occur at a transmitter, but the modulated geometric phase may only become measurable at a receiver.

It may be that the reference component of the light beam is not susceptible to accumulation of geometric phase, so that the reference component accumulates no geometric phase.

The signal and reference components may be separated from other components by splitting the beam into two beams, spatially filtering one or both beams to select the signal and reference components, and recombining the selected components to reform the beam.

Generally, phase changes resulting from propagation between a receiver and a transmitter (i.e. propagation of the beam over a path over which geometric phase changes are generally not expected to occur) will be the same for the signal component and the reference component as they will co-propagate with each other; thus, the signal component and the reference component will propagate along a common physical path between a receiver and a transmitter.

The modal state may be a pure mode or a mixture of modes.

The transformation may be from a first modal state to a second modal state and from a second modal state to a third modal state, and then back to the first modal state.

The reference component may be in a fundamental mode.

The mode transformations can be understood to form a trajectory on a Poincaré Sphere. When example embodiments of the invention are considered in the context of a Poincaré Sphere model, the skilled person will understand that the closing of the trajectory to form a closed loop on the Poincaré Sphere is the act that causes the geometric phase to come into existence. A comparison of the relative phases of two components (for example, (i) the signal component before and (ii) the signal component after a set of transformations) will usually only be meaningful when both components are in the same modal state. Thus, when the signal component is returned to the first mode, the geometric phase it has acquired whilst being transformed into the one or more different modes becomes apparent.

The loop may be closed at a transmitter end of the apparatus. Alternatively, the loop may be closed at a receiver end of the apparatus. Thus, in the latter case, an eavesdropper who intercepts the beam between a transmitter and a receiver would not be able to make a useful comparison of the phases of the signal and reference components, because those components would not be in the appropriate modal states. In this example embodiment, only when the loop is closed at the receiver, i.e. only after the beam has safely passed the dangers of interception, does the geometric phase become measurable.

The modal states of the signal and reference components may be orbital-angular-momentum modal states. Thus, the modulation may be modulation with the data of the orbital angular momentum of the signal component of the beam.

The reference component may have zero orbital angular momentum.

The signal component may be transformed from a first orbital-angular-momentum modal state into a different orbital-angular-momentum modal state, then into at least one further different orbital-angular-momentum modal state, and then back to the first orbital-angular-momentum modal state, such that the modal state transformations form a closed loop on a Poincaré Sphere. The signal component may begin as a Laguerre-Gaussian mode of order greater than or equal to 1, for example a $LG_0^{+1}$ mode. It may be that the signal component is transformed during the method into a Hermite-Gaussian mode, for example a $HG_{01}$ mode, a $HG_{10}$ mode, or a mixed state of $HG_{01}$ and $HG_{10}$ modes. It may be that the signal component is transformed during the method from a Hermite-Gaussian mode to a Laguerre-Gaussian mode, for example from a $HG_{01}$ mode, a $HG_{10}$ mode, or a mixed state of $HG_{01}$ and $HG_{10}$ modes to a $LG_0^{+1}$ mode.

The reference component may begin as a Laguerre-Gaussian mode, for example a $LG_0^0$ mode. It may be that the reference component remains as a $LG_0^0$ mode throughout the method.

The signal component may be transformed using a pair of cylindrical lenses having parallel axes.

The signal component may be transformed using a pair of Dove prisms, the prisms being arranged at an angle relative to each other.

The angle may be about the direction of the beam.

The geometric phase may be accumulated by passage though (i) a first pair of cylindrical lenses having parallel axes, (ii) at least one pair of Dove prisms, and (iii) a second pair of cylindrical lenses having parallel axes. All of elements (i) to (iii) may be at a transmitter end of the apparatus. At least one of elements (i) to (iii) may be (in addition or alternatively) at the receiver end of the apparatus, with the other elements being at the transmitter end of the apparatus. Thus, the generation of the geometric phase may be distributed across the transmitter and receiver.

The modulation of the orbital angular momentum modal state may be achieved using a modulator circuit arranged to drive an optical device in the path of the beam, so that the orbital angular momentum state of the signal component is modulated by movement of the device driven by the modulator.

A further layer of protection may be provided by imparting at a first transmitter a random phase change to the signal component or the reference component. The random phase change may be, for example, a data-like sequence, for example a series of 1s and 0s (e.g. a series $+\pi/2$ and $-\pi/2$ phase shifts). The beam may be transmitted from the first transmitter to a receiver, where the data may be encrypted onto the beam, and the beam transmitted back to the first transmitter. The random phase change may then be removed from the beam at the first transmitter. An eavesdropper intercepting the beam including the encrypted data would face the additional task of removing the random phase changes from the beam in order to distinguish the data.

Higher-order orbital-angular-momentum components may be generated using a 2D grating.

In a second aspect, the invention provides a method of decrypting data from an electromagnetic beam, comprising: (i) receiving an electromagnetic beam having a signal component having a modal state, wherein the signal component is susceptible to accumulation of a geometric phase, and a reference component, the beam having been transmitted along a path over at least part of which the signal component accumulates a geometric phase by transformation of its modal state from a first modal state to a second modal state, from the second modal state to at least one further modal state, and then back to the first modal state, the accumulated geometric phase being modulated with the data by modulation of the modal state transformations, and (ii) comparing an overall phase of the signal component with an overall phase of the reference component so as to retrieve the modulation.

The overall phase of the signal component will of course include the accumulated geometric phase.

The reference component may be in a fundamental mode; for example, it may have zero orbital angular momentum. It may be that the reference component acquires no geometric phase.

The modulation may be retrieved by focusing the beam onto a detector and observing an interference pattern resulting from interference between the two components.

The accumulated geometric phase may be removed by changing the orientation of optical elements in a manner complementary to orientation changes made to corresponding elements during an encryption phase.

The accumulated geometric phase may be removed prior to decryption by passage though (i) a first pair of cylindrical lenses having parallel axes, (ii) a pair of Dove prisms, and (iii) a second pair of cylindrical lenses having parallel axes.

The geometric phase may be modified after receiving the beam, by using a pair of cylindrical lenses having parallel axes.

The geometric phase may be modified after receiving the beam, by using a pair of Dove prisms, the prisms being arranged at an angle relative to each other. The angle may be about the direction of the beam.

The modal state may be a pure mode or a mixture of modes.

The modal states of the signal and reference components may be orbital-angular-momentum modal states. Thus, the modulation may be modulation with the data of the orbital angular momentum state of the signal component of the beam.

Higher-order orbital-angular-momentum components may be removed using a 2D grating corresponding to a grating used to generate the components.

The signal and reference components may be separated from other components by splitting the beam into two beams, spatial filtering each beam to select components, recombining selected components to reform the beam.

The method may comprise imparting a random modal state variation to the signal component or a random relative phase variation between the signal and reference components. The method may comprise transmitting the beam including the signal component with the random variation to a receiver, prior to receiving the beam back from the receiver with the data modulated onto the geometric phase of the signal component. Thus the beam may be sent with the random variation to the receiver, and received back from the receiver with the random variation plus the geometric phase modulation. The method may then comprise removing the random variation from the signal component. Thus, removal of the random variation unmasks the geometric phase.

A third aspect of the invention provides apparatus for encrypting data onto an electromagnetic beam, comprising:

a plurality of optical elements arranged to generate in the electromagnetic beam a signal component having a modal state, wherein the signal component is susceptible to accumulation of a geometric phase, and a reference component;

a plurality of optical elements arranged to transform the modal state of the signal component from a first modal state to a second modal state, from the second modal state to at least one further modal state, and then back to the first modal state; and a modulator connected to at least one of the optical elements and arranged to modulate with the data the modal state of the signal component.

The signal and/or reference component may be generated using a 2D grating. The grating may be a computer generated hologram. The grating may include one or more phase line dislocations.

The apparatus may include a beamsplitter arranged to separate the beam into two beams, filters to spatially filter each beam to select the components, and a beamsplitter to recombine the selected components to reform the beam.

The apparatus may comprise a plurality of optical elements arranged to alter an orbital angular momentum state of the signal component, the elements comprising a pair of cylindrical lenses having parallel axes.

The apparatus may comprise a second pair of cylindrical lenses having parallel axes.

The apparatus may comprise a plurality of optical elements arranged to alter an orbital angular momentum state of the signal component, the elements comprising a pair of Dove prisms, the prisms being arranged at an angle relative to each other. The angle may be about the direction of the beam.

The apparatus may comprise a modulator circuit arranged to drive an optical element in the path of the beam, so that the modal state of the signal component of the beam is modulated by movement of the element driven by the modulator.

The apparatus may comprise a random-phase generator, connected to an optical element within the apparatus, the element being arranged to impart a random modal state variation to the signal component or a random relative phase variation between the signal and reference components.

The apparatus may comprise an optical circulator.

The apparatus may further comprise apparatus for decrypting the data from the beam.

A fourth aspect of the invention provides apparatus for decrypting data from an electromagnetic beam, comprising apparatus for receiving an electromagnetic beam having a signal component having a modal state, wherein the signal component is susceptible to accumulation of a geometric phase, and a reference component, the beam having been transmitted along a path over at least part of which the signal component accumulates a geometric phase by transformation of its modal state from a first modal state to a second modal state, from the second modal state to at least one further modal state, and then back to the first modal state, the accumulated geometric phase having been modulated with the data;

a plurality of optical elements arranged to alter the modal state of the signal component; and a demodulator arranged to compare an overall phase of the signal component with an overall phase of the reference component, so as to retrieve the modulation.

The apparatus for decrypting may comprise any appropriate combination of the optical elements used in the apparatus for encrypting the data onto the beam.

The decrypting apparatus may be connected to the encrypting apparatus by an optical fibre.

The decrypting apparatus may comprise a detector arranged to detect an interference pattern resulting from interference between orbital-angular-momentum modes emerging from fibre. The signal component may be degenerated (that is, reduced to a fundamental mode) using a 2D grating. The grating may be a computer generated hologram. The grating may include one or more phase line dislocation.

The apparatus may comprise a plurality of optical elements arranged to alter an orbital angular momentum states of the signal component, the elements comprising a pair of cylindrical lens having parallel axes.

The apparatus may comprise a plurality of optical elements arranged to alter an orbital angular momentum states of the signal component, the elements comprising a pair of Dove prisms, the prisms being arranged at an angle relative to each other. The angle may be the direction of the beam.

The apparatus may comprise a second pair of cylindrical lenses having parallel axes.

The apparatus may comprise a modulator circuit arranged to drive an optical element in the path of the beam, so that the orbital-angular-momentum state of the signal component is modulated by movement of the element driven by the modulator.

The apparatus may comprise a plurality of optical elements arranged to combine the signal component and the reference component into a single mode.

The apparatus may include a feedback loop, which may receive input from a detector of the decrypted data and a random phase generator, and which may be connected to an optical element within the apparatus, the element being arranged to cancel a random orbital-angular-momentum state variation from the signal component or a random relative phase variation between the signal and reference components.

A fifth aspect of the invention provides a method of decrypting data from an electromagnetic beam, comprising: (i) receiving an electromagnetic beam having a first orbital-angular-momentum mode and a second orbital-angular momentum mode, the beam having been transmitted along a path over at least part of which at least one of the orbital angular momentum modes accumulates a geometric phase, the geometric phase of the first orbital-angular-momentum mode having been modulated by the data, and (ii) comparing the overall phase of the first orbital-angular-momentum mode with the overall phase of the second orbital-angular-momentum mode so as to retrieve the geometric phase modulation.

A sixth aspect of the invention provides a method of communicating encrypted data, comprising:

(1) generating a beam including a first orbital-angular-momentum component and a second orbital-angular-momentum component;

(2) adding to the beam a random or data-like differential phase between orbital-angular-momentum components;

(3) transmitting the beam to a person who is to encrypt the data;

(4) receiving the beam back from the person;

(5) compensating for the combination of both the added differential phase and any path-dependent phase differences accumulated between steps (3) and (4), so as to balance and equalize the phase between the two modes;

(6) further receiving the beam from the person, the beam now including data encrypted on the beam by the person as an additional data differential (geometric) phase between the orbital-angular-momentum components;

(7) repeating the compensation of step (5) and hence extracting the data as a residual phase difference between the orbital-angular-momentum components.

One or more of steps (1) to (7) may be carried out in parallel; for example, steps (5), (6) or (7) may be carried out in parallel.

It will be appreciated that features of the present invention described in relation to the methods of the present invention are equally applicable to the apparatus of the present invention and vice versa, and similarly that features of the present invention described in relation to encryption are equally applicable in respect of decryption and vice versa (in both cases, unless the common sense of the skilled person dictates otherwise).

BRIEF DESCRIPTION OF THE DRAWINGS

Certain illustrative embodiments of the invention will now be described in detail, by way of example only, with reference to the accompanying schematic drawings, in which.

DETAILED DESCRIPTION

Figure 1:
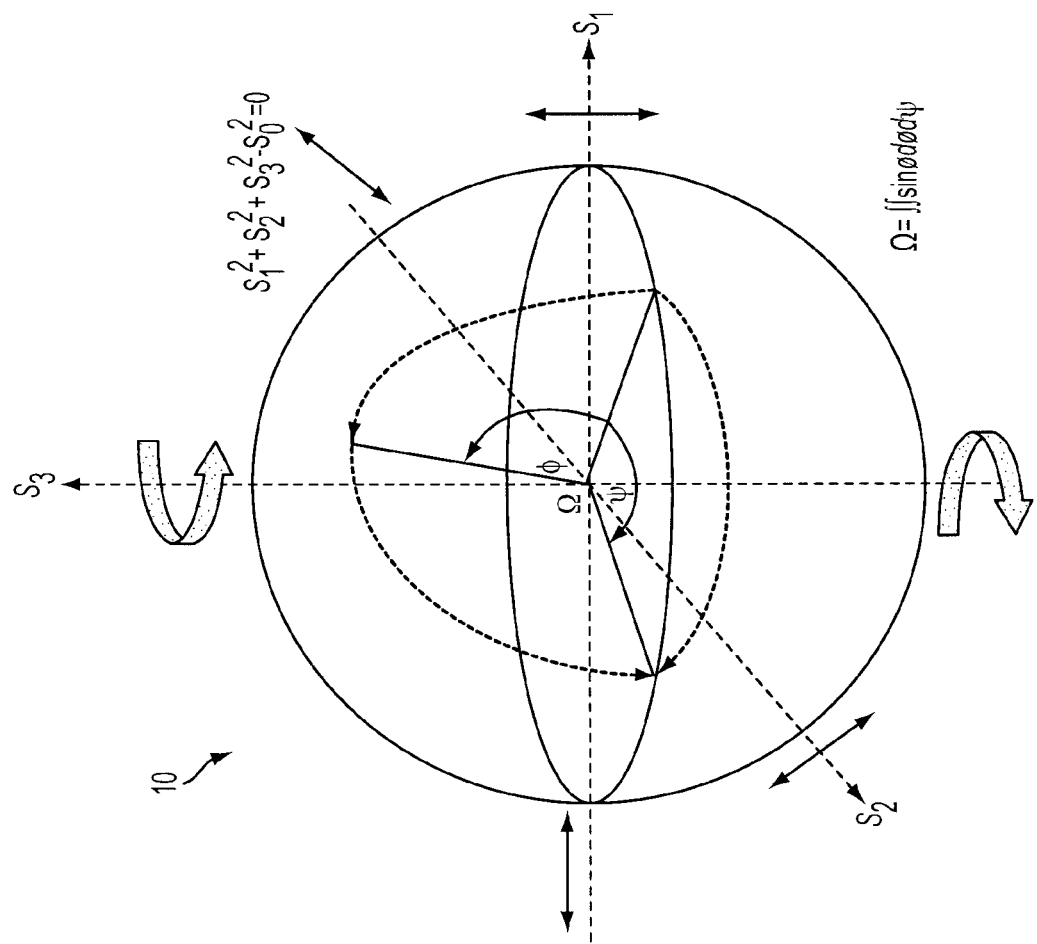
FIG. 1 is the Poincaré Sphere in Stokes space.
Figure 2:
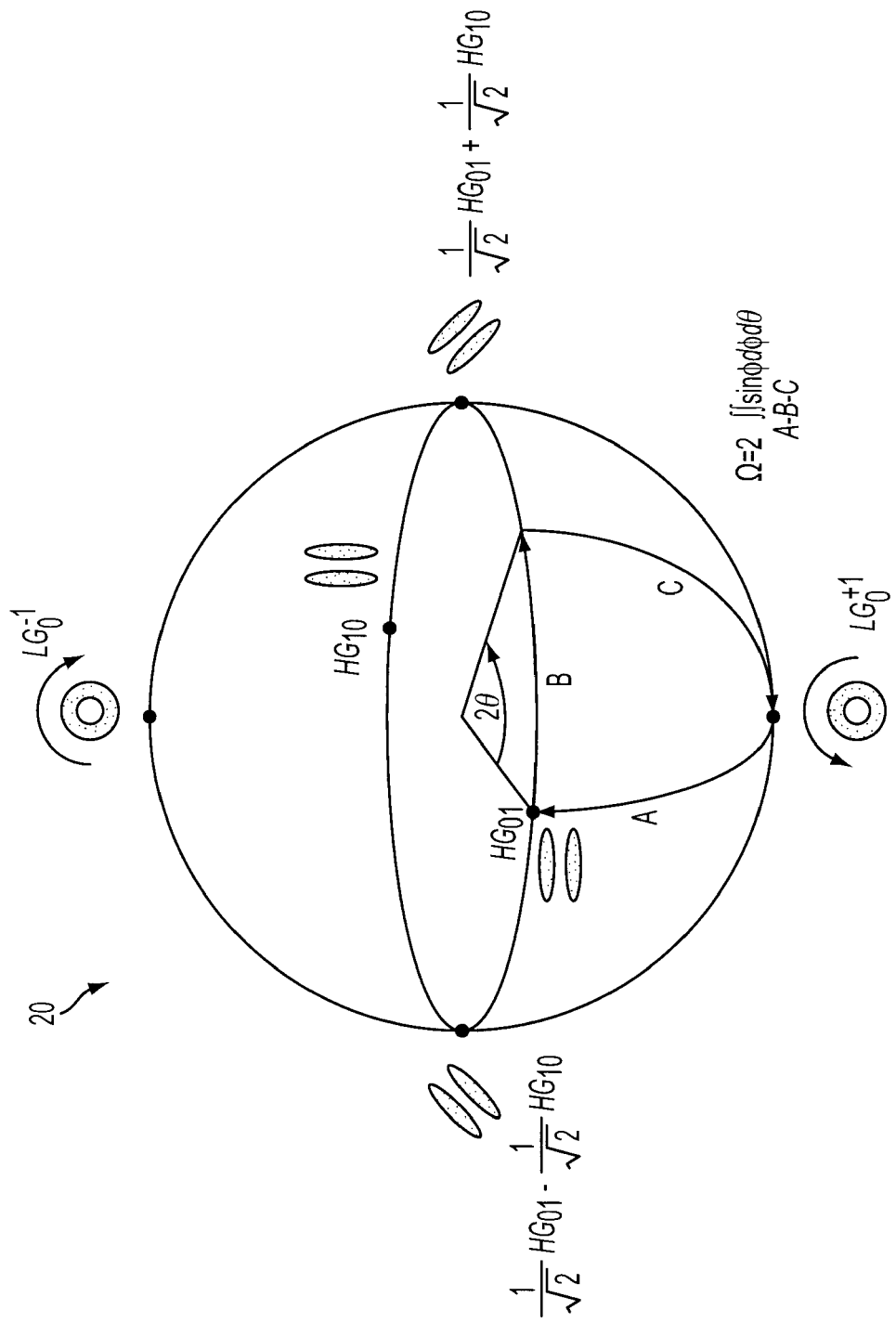
FIG. 2 is the Poincaré Sphere for orbital angular momentum modes.
Figure 3:
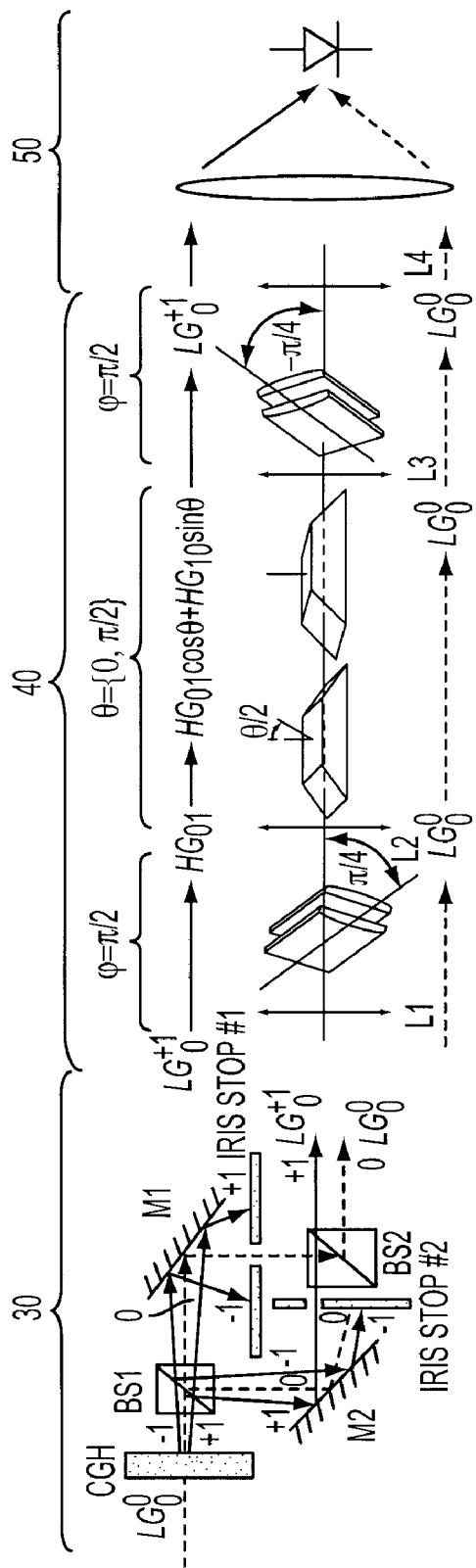
FIG. 3 is a prior-art quantum computing device for generating a beam of light having a measurable geometric phase.
Figure 4:
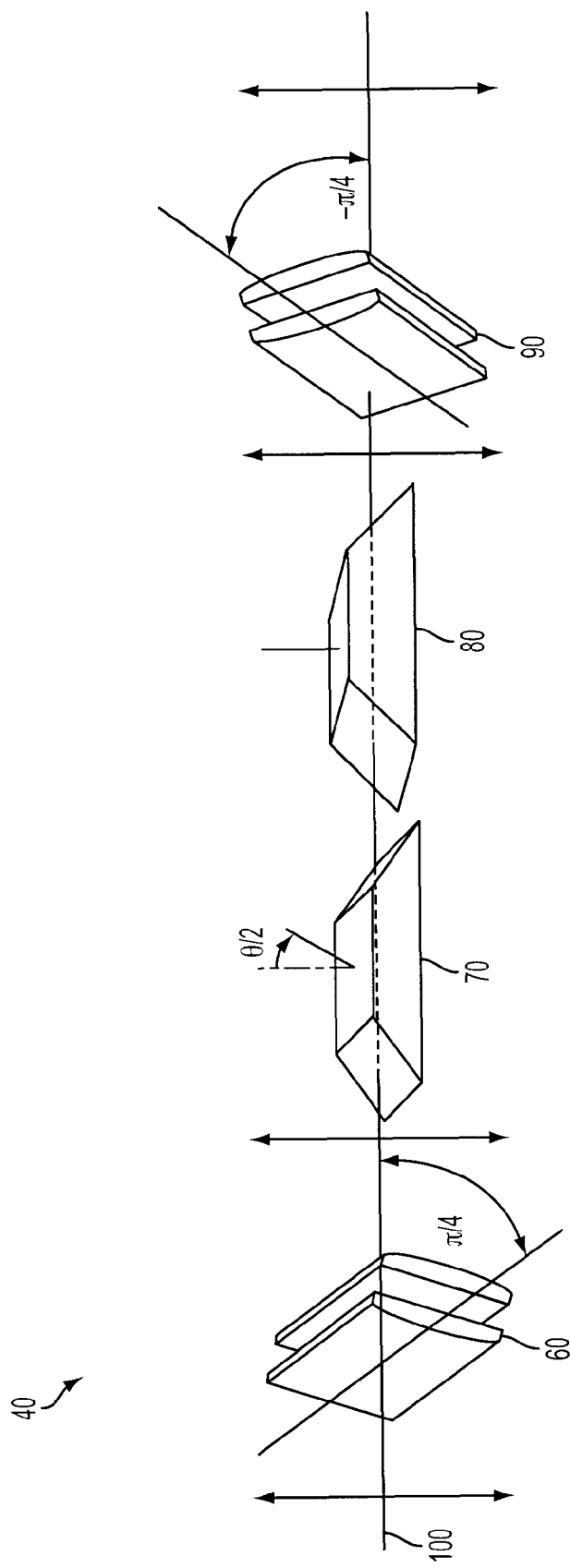
FIG. 4 shows in more detail a portion of the device of FIG. 3, the portion being for adding a geometric phase to an orbital angular momentum mode generated by the portion of FIG. 5(a)
Figure 5A:
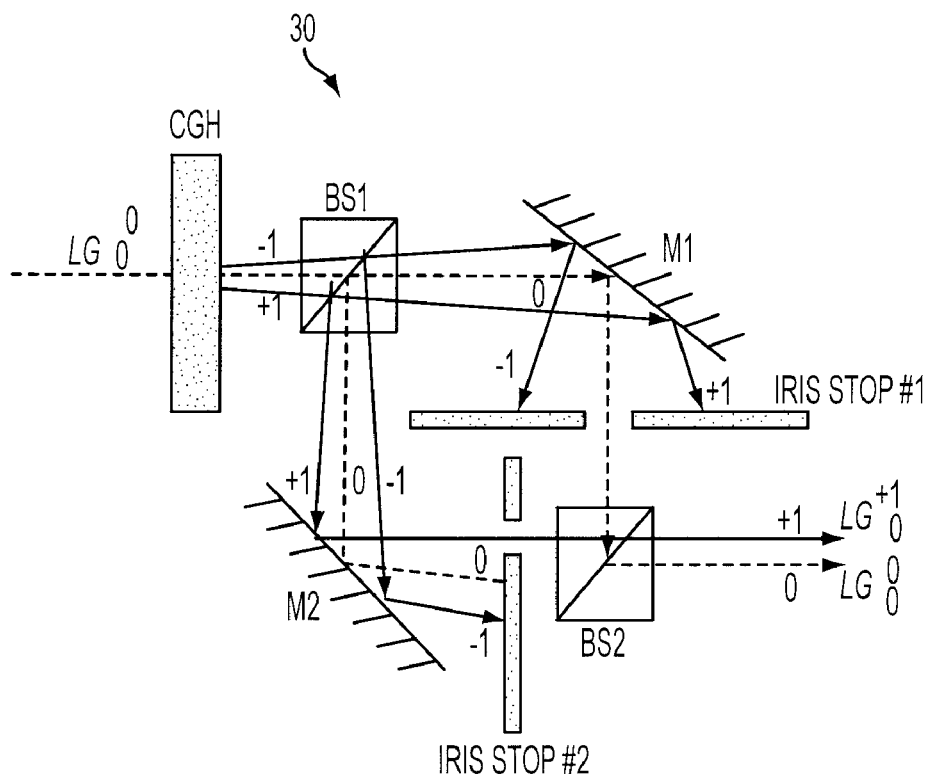
FIG. 5 shows (a) in more detail a mode-generation portion of the device of FIG. 3, and (b) a computer-generated holographic grating used in that mode-generation portion.
Figure 5B:
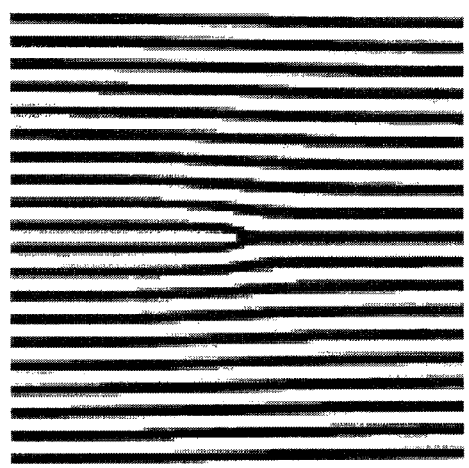
Figure 6:
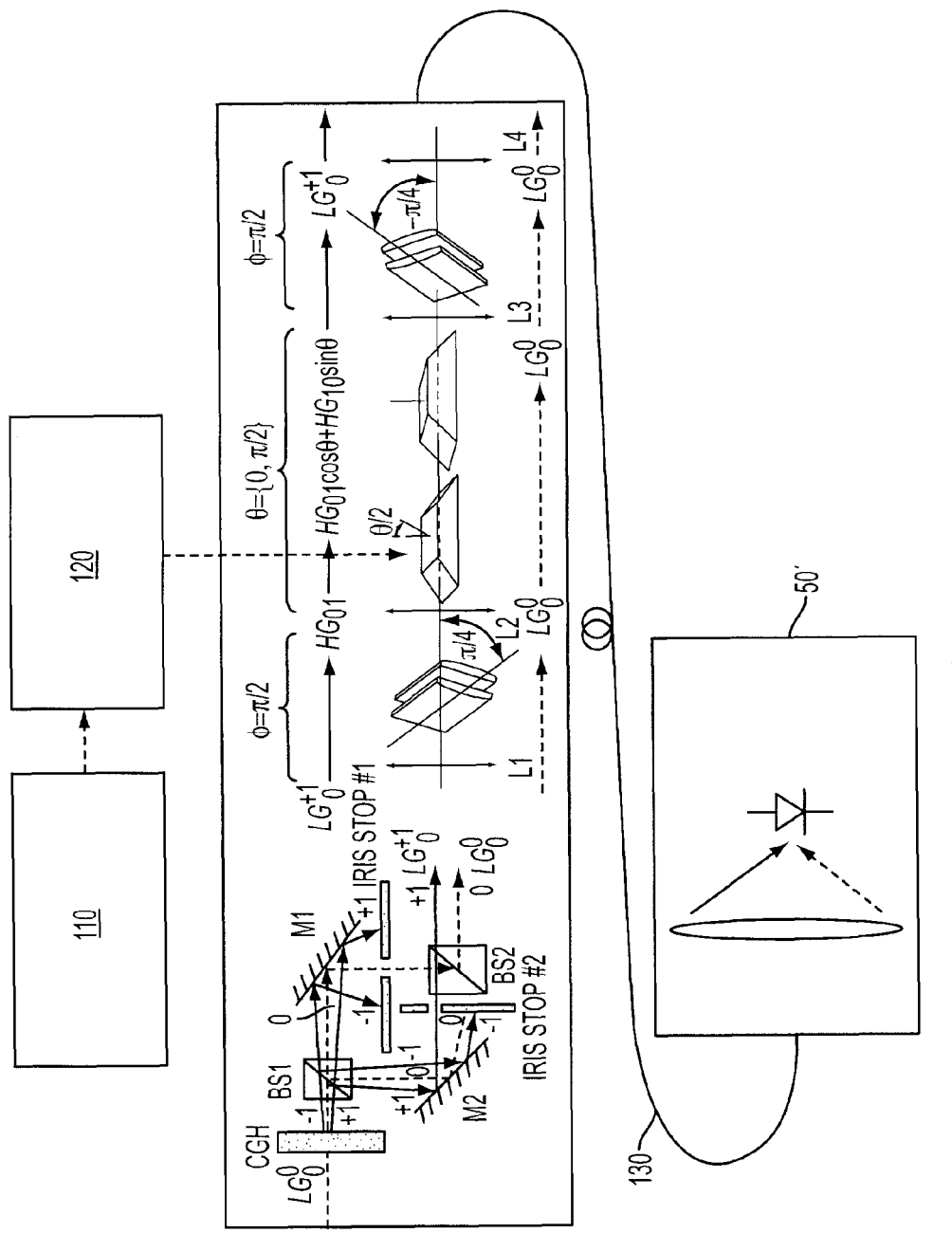
FIG. 6 is an encryption device according to a first example embodiment of the invention.

A first example embodiment (FIG. 6) employs, at a first (transmitter) end, apparatus similar to that described by Galvez (FIG. 3). However, the apparatus further comprises a modulator circuit 120, which drives the actuator of the first Dove prism 70, and hence alters the angle θ/2 of the prism 70 according to the data 110 to be encrypted, which modulates the azimuthal phase of the geometric-phase-sensitive orbital-angular-momentum component (the signal component) of the light beam. Thus, by appropriate rotation of the first Dove prism 70, the data for encryption is phase modulated onto the $LG_0^{+1}$ mode.

The second parallel lens pair 90 can also be rotated as required.

The modulated $LG_0^{+1}$ mode and the reference mode $LG_0^{0}$ are coupled into a suitable multi-moded optical fibre 130 and transmitted through the fibre 130 to a remote receiver 50'. In this example, the light emerging from the receiver end of the fibre 130 is imaged directly onto a photodiode or CCD camera (in a similar manner to the Galvez quantum-computing arrangement, although of course there is no modulator or transmission fibre in that apparatus). The geometric phase (including the modulation) added to the signal orbital-angular-momentum component at the transmitter is deduced by observing the relative rotations of the interference pattern resulting from superposition of the $LG_0^{0}$ and $LG_0^{+1}$ modes.

In the embodiments of the invention described below, the data signal 110 is again modulated onto the geometric phase of the transmitted light by a modulator 120 driving the first Dove prism 70, and also second lens pair 90 as required. However, for ease of illustration, the data signal 110 and modulator 120 are not shown in the corresponding drawings. Of course, the skilled person will understand that, in other embodiments of the invention, the modulator could be arranged to drive other components of the system to modulate the orbital angular momentum state of the beam. Thus, the modulator may drive the first pair of cylindrical lenses 60, the second Dove prism 80, or the second pair of cylindrical lenses 90, or functionally equivalent components for example in fibre or in integrated optics.

Figure 7:
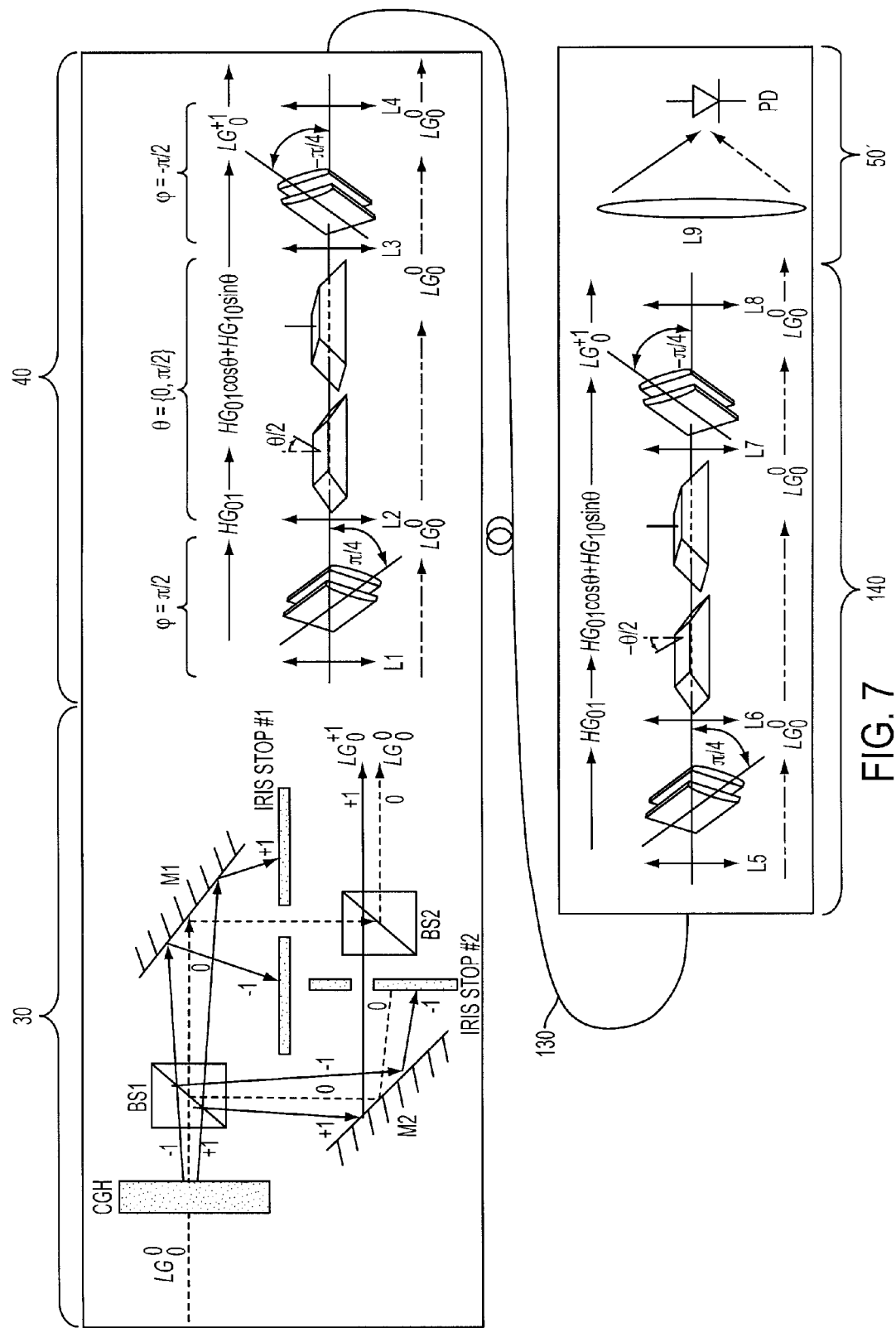
FIG. 7 is an encryption device according to a second example embodiment of the invention.

In a second example embodiment of the invention (FIG. 7), a further layer of protection is added. At its transmitter end, the apparatus is the same as that of the first example embodiment. However, a second portion 140 for adding geometric phase is provided, at the receiver end of the fibre 130.

In the second portion, the two components are passed through second set of pairs of cylindrical lenses and Dove prisms. The receiver can "undo" the geometric phase modulation imparted onto the $LG_0^{+1}$ modes at the transmitter end. Again, the resulting $LG_0^{0}$ and $LG_0^{+1}$ modes are directly imaged onto a photodiode or CCD camera, and the relative rotations of the resulting interference patterns observed. If perfect "undoing" of the geometric phase has been accomplished, then no rotations of the interference pattern should be observed. However, if there has been any attempt to eavesdrop (e.g. by evanescent field coupling, or introduction of intervening taps) additional phase variations will be imparted onto the $LG_0^{+1}$ mode compared with the $LG_0^0$ modes. In that case, it will be found that at the receiver end it is no longer possible simply to negate the phase differences between the two modes, and that will be evidence of an attempt to eavesdrop.

In a third example embodiment of the invention (FIG. 8), at its transmitter end, the apparatus is again the same as that of the first example embodiment. However, a second portion 160 (similar to portion 30) for degenerating the orbital-angular-momentum modes is provided, at the receiver end (FIG. 9). In portion 160, the light from the receiver end of the fibre 130 is imaged onto a copy of the CGH used to originally create the two modes of light. The second CGH diffracts the light in the same way as the first, and the resulting diffracted orders are shone onto a power beam splitting cube BS3. Stops are again used to select particular diffracted orders, with the first path selecting the undiffracted $0^{th}$-order of the $LG_0^0$ mode, whilst the second path selects the $-1^{st}$-order of the $LG_0^{+1}$ mode. By selecting the $-1^{st}$-order of the $LG_0^{+1}$ mode, the CGH acts now to convert the $LG_0^{+1}$ mode back into a lowest order $LG_0^0$; i.e. the +1 charge of OAM possessed by the original $LG_0^{+1}$ mode is negated by the $-1$ charge of OAM imparted by the CGH. Thus there are now two spatially identical $LG_0^0$ modes, but with different phases. Mirror M3 (or M4) is placed in a variable telescopic arrangement, so that the optical path of the original $LG_0^0$ mode can be varied to bring it back in phase with the new $LG_0^0$ (previously $LG_0^{+1}$) mode. The two modes are then recombined at beamsplitter BS4, are focused onto a photodiode, and the relative phase between them inferred.

Figure 10:
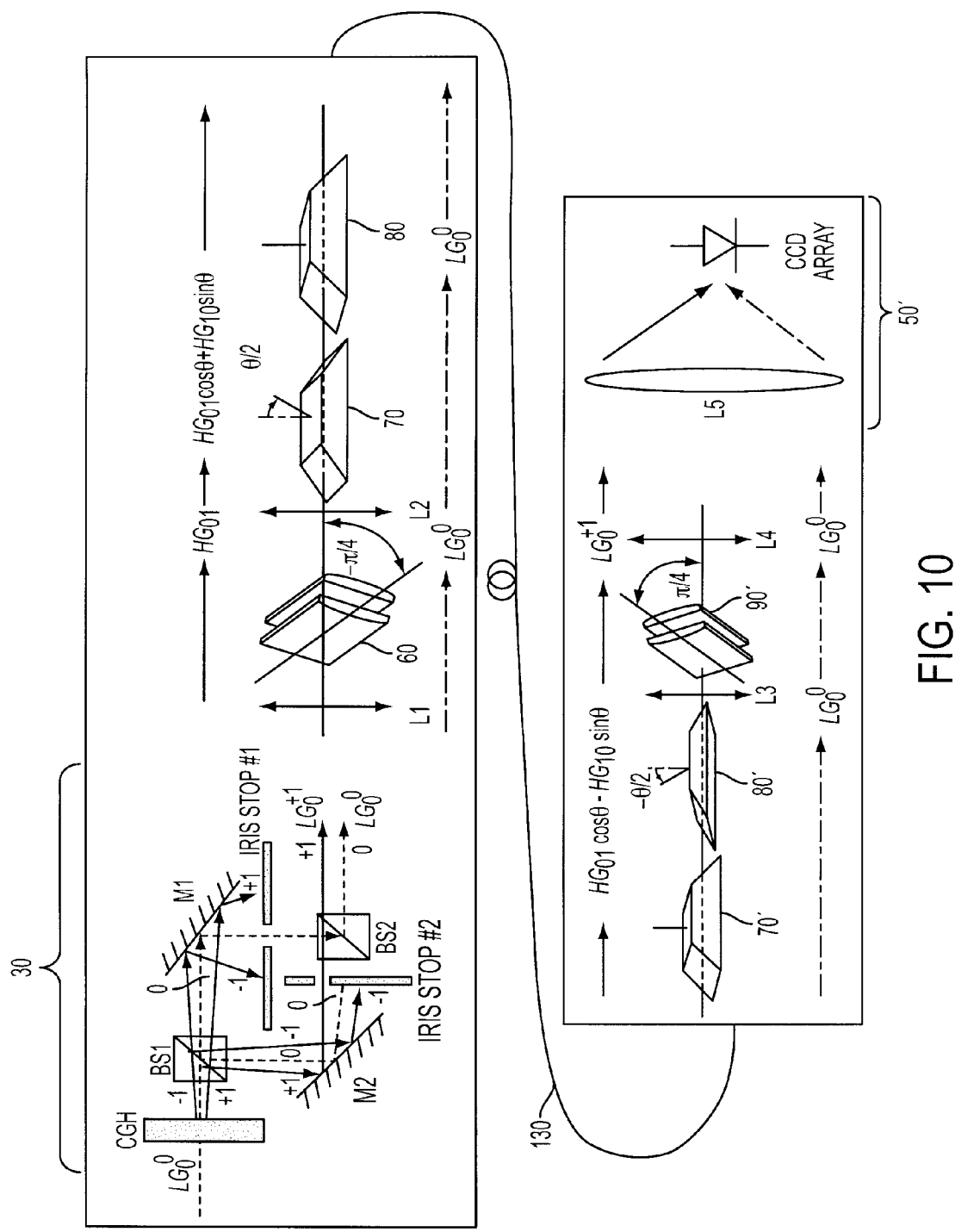
FIG. 10 is an encryption device according to a fourth example embodiment of the invention.

In all of the embodiments described so far, the geometric phase is added to the light beam at the transmitter end, before the beam passing into the optical fibre 130. Whilst eavesdropping would be very difficult in those arrangements, for the reasons discussed above, in a fourth example embodiment (FIG. 10) a further level of protection is provided. In this example, the geometric phase associated with a closed contour trajectory on the surface of the Poincaré sphere is achieved partially at the transmitter end, and partially at the receiver end. Whereas in the earlier examples, the $LG_0^{+1}$ mode was modulated with a geometric phase at the transmitter, and then transmitted along with the reference $LG_0^0$ mode to the receiver, here the geometric phase associated with the $LG_0^{+1}$ mode is only accumulated once the $LG_0^{+1}$ mode actually arrives at the receiver.

In this example embodiment, the transmitter end of the system again comprises the portion 30 for generating the orbital-angular-momentum modes, but it has only three of the four components that previously made up the portion 40 for adding the geometric phase, namely first cylindrical lens pair 60, first Dove prism 70 and second Dove prism 80. There is no second cylindrical lens pair.

At the receiver end, three of the four elements of geometric-phase portion 40 are provided, this time third Dove prism 70', fourth Dove prism 80' and second cylindrical lens pair 90'. (There is, as before, a portion 50 for detecting the added geometric phase.)

Hence, considering the trajectory along the Poincaré sphere, the $LG_0^{+1}$ mode starts at the south pole, and the combination of cylindrical lens pair 60 and Dove prisms 70, 80 causes the trajectory to reach a point on the equator. The resulting $<HG_{01} \cos\theta + HG_{10} \sin\theta>$ mode is then transmitted along the fibre 130, where the Hermite-Gaussian mode mix (as described by the angle $\theta$) varies in a random fashion as a result of fibre perturbations such as refractive index variations, fibre kinks, twists and turns (note, however, that such effects would have to be systematic—and extreme—over extended lengths of fibre for the two Hermite-Gaussian modes to become significantly out of phase with each other, say to reach 90 degrees out of phase so as to convert the modes into a Laguerre-Gaussian mode).

On reaching the receiver, the cylindrical lens pair 90' causes the mode to be transformed back to the $LG_0^{+1}$ mode, and the contour is closed. The $LG_0^{+1}$ mode thus accumulates a geometric phase, which varies according to the overall geometry of its trajectory on the Poincaré sphere surface, and the associated solid angle. The $<HG_{01} \cos\theta + HG_{10} \sin\theta>$ mode accumulates an additional path-dependent phase as it traverses the optical fibre 130; however, the co-propagating $LG_0^0$ mode will also have accumulated the same path-dependent phase, since it follows exactly the same path; consequently, the phase difference between the two modes on arrival at the receiver is purely the geometric phase. The cylindrical lens pair 90' at the receiver end of the link has to be rotated by an appropriate angle, $\pi/4 + \theta$ in order to correctly close the Poincaré Sphere contour and achieve the correct geometric phase. The Dove prism is thus used to balance the geometric phase introduced at the transmitter. The angle of the prism is a measure of the data, and should cancel exactly the introduced geometric phase. Note that the correct geometric phase is only generated at the receiver end, thus causing further problems for a potential eavesdropper.

Figure 8:
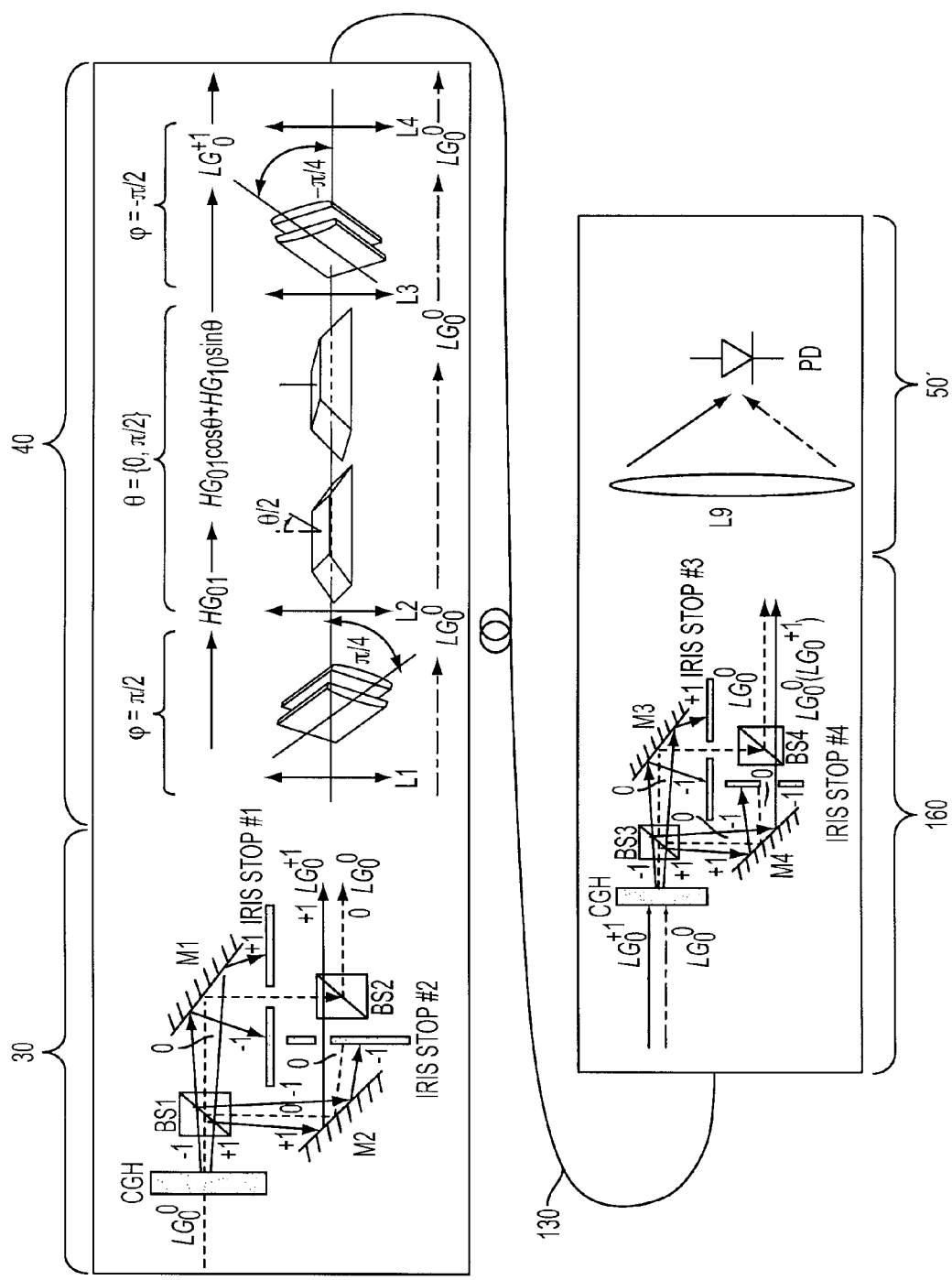
FIG. 8 is an encryption device according to a third example embodiment of the invention.
Figure 9:
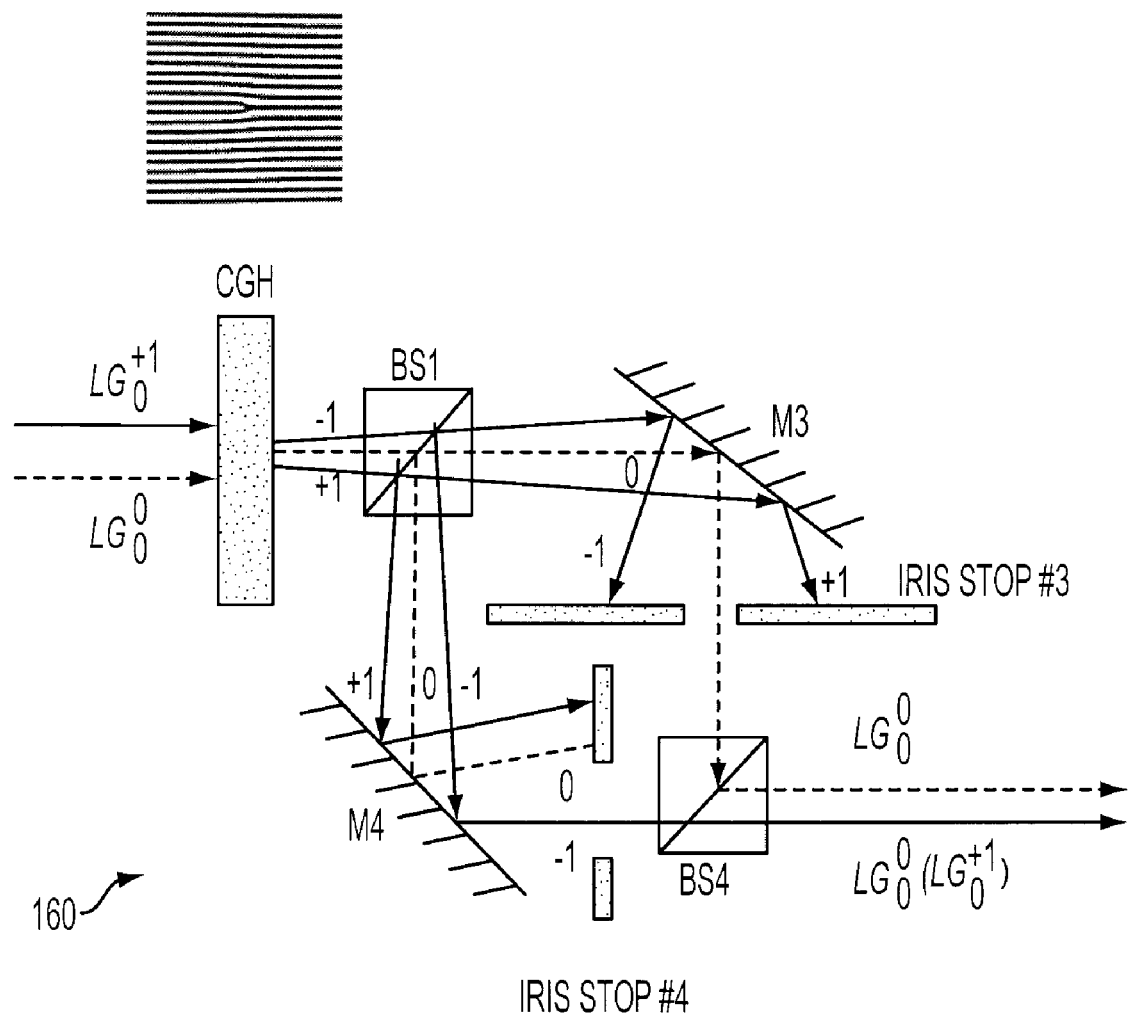
FIG. 9 shows in more detail a mode-degeneration portion of the device of FIG. 8, including (inset) a computer-generated holographic grating used in that mode-degeneration portion.

A fifth example embodiment (FIG. 11) has an alternative arrangement at the receiver end, similar to that of FIG. 8, wherein a second portion 160 (similar to portion 30) for generating the orbital-angular-momentum modes is provided, at the receiver end, prior to detection portion 50' and subsequent to cylindrical lens pair 90'. As in the FIG. 8 embodiment, the $LG_0^{+1}$ mode is converted back to a $LG_0^0$ mode prior to interfering with the co-propagating $LG_0^0$ mode at the detector portion 50'. The interference pattern consists of fringes, with the relative lateral position of the dark and light stripes indicating the relative phase between the two modes.

The eavesdropper could know in advance that differential-geometric-phase cryptography is being employed, and so use a copy of the receiver in order to try and "read" the geometric phase. However, there are at least two hurdles to be overcome: (1) employing a suitable "protocol" between the sender (who is traditionally referred to in cryptography as Alice) and the receiver (who is traditionally referred to in cryptography as Bob) that will cause an additional layer of encryption (as described later); and (2) physically, as long as the fibre is unbroken along the distance, the eavesdropper will have to use side-wall evanescent tapping techniques in order to tap off a proportion of the signal. Side-wall tapping is essentially asymmetric in geometry, compared with the cylindrical symmetry of an optical fibre, such that many of the key properties of the light modes will be destroyed in the act. For example, since side-wall tapping is so asymmetric, the light emerging from the tap will tend to be determined by a single HG mode, $HG_{01}$ or $HG_{10}$, depending on the spatial position of the side-wall tap; hence the $<HG_{01} \cos\theta + HG_{10} \sin\theta>$ mode mix (as described by $\theta$) will be ruined. In addition, there will be considerable mixing between the two components (i.e. the $<HG_{01} \cos\theta + HG_{10} \sin\theta>$ modes and the co-propagating $LG_0^0$ mode), so as to make them very difficult to distinguish by the eavesdropper. It should be noted, that the eavesdropping will therefore also cause considerable perturbation to the two onward travelling modes, such that it will be clear at the receiver end that a large disturbance has occurred somewhere in between, and that there has been an eavesdropping attack.

Even if the eavesdropper is able to "clean" up the resulting light signals and retrieve reasonable exemplars of the two transmitted modes, and pass them through a copy of the receiver, there is still the protocol aspect to be overcome.

Figure 11:
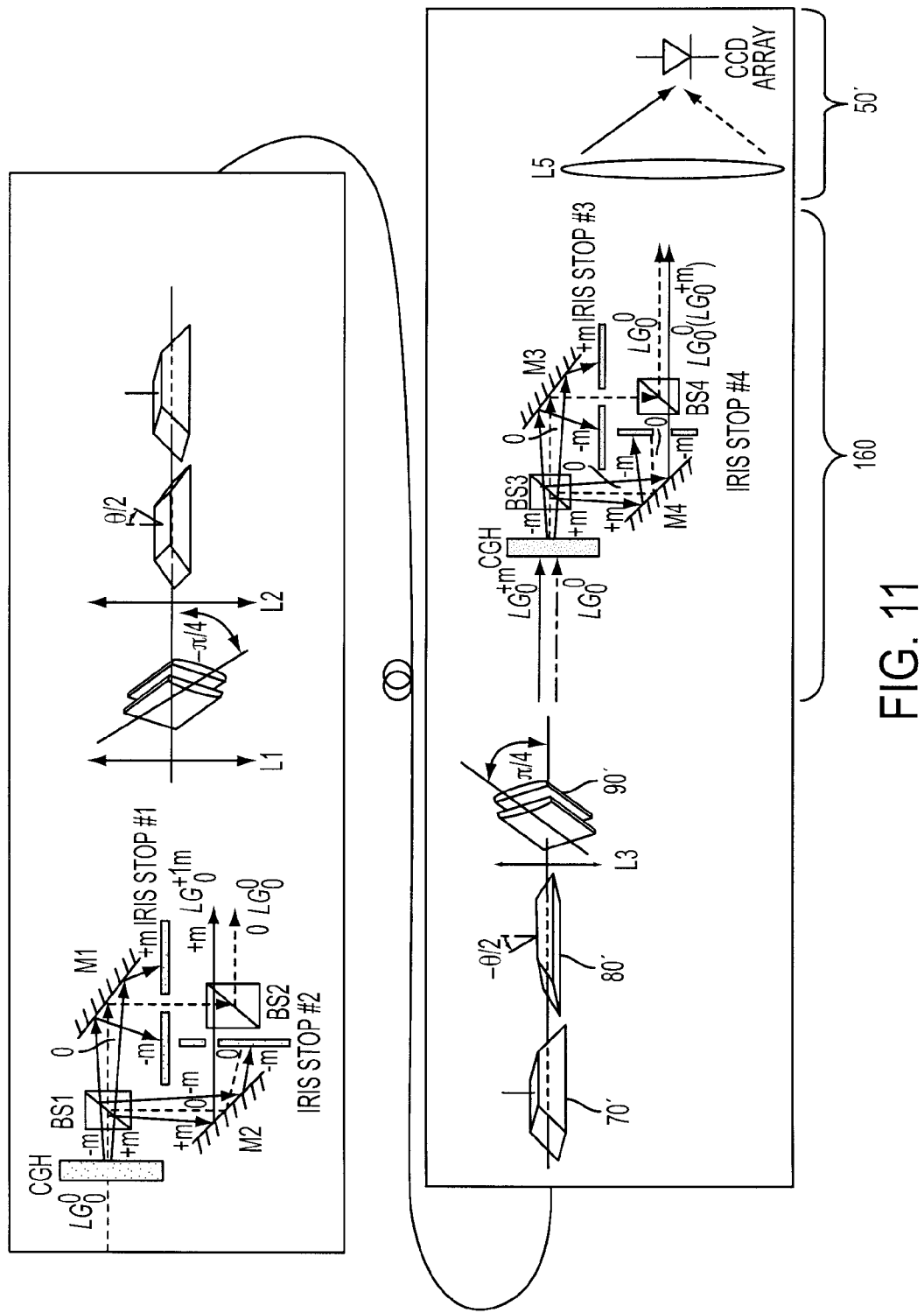
FIG. 11 is an encryption device according to a fifth example embodiment of the invention.

An additional level of complexity can be added to the communication between transmitter and receiver by changing the "base", similar to the BB84 protocol. For example, a spatial light modulator (SLM) can be employed to produce and change dynamically the CGH being used to diffract the light at the transmitter. According to the CGH used, higher order "charges" can be used to produce higher-order LG modes, i.e. $LG_0^{\pm m}$, where m signifies the degree of charge imparted by the CGH. That is possible because the symmetries of the Poincaré sphere also work for such higher-order LG modes, and the combinations of parallel cylindrical lenses and Dove prisms can be similarly used to impart a geometric phase on the $LG_0^{\pm m}$ modes. In this case, at the receiver end as shown in FIG. 11, a second SLM is used to display a CGH with a particular charge. As long as the CGH at the receiver end matches that of the transmitter, then the $LG_0^{\pm m}$ mode will be converted back down to a $LG_0^0$ mode. The converted mode can then be directly interfered with the transmitted $LG_0^0$ mode, and their relative phase difference (due to the geometric phase) can be easily ascertained due to the resulting interference pattern. According to the relative phase, the interference pattern will exhibit some degree of azimuthal rotation. The CGH basis can also be varied randomly at the transmitter and receiver ends respectively. Only those measurements made when both CGHs are the same charge are valid, and can be used to determine the information (key) to be sent. That is achieved by Bob (the receiver) communicating openly back to Alice (the transmitter) which charge bases he has used to perform the measurements. Alice compares those bases with the bases she has used, and she openly advises him which measurements he has made are valid.

Instead or as well as varying the charge on the CGH, the CGH's can be azimuthally rotated by a random angle at both the transmitter and receiver ends; that will cause a relative rotation of the interference pattern at the receiver end, and so will additionally disguise the geometric phase. Again, Bob communicates openly back to Alice which azimuthal rotation he has used and Alice compares those rotations with the rotations she has employed, and she openly advises him which measurements he has made are valid.

In a sixth example embodiment of the invention (FIG. 12), one of the persons wishing to communicate (Bob) uses both transmitting and receiving equipment, even to establish a one-way encrypted connection from the other person (Alice). Bob has an orbital-angular-momentum-mode generation portion 30, in which as before two orbital angular momentum modes (i.e. the signal and reference components) are generated. The components are fed into a first geometric-phase adding portion 40', which again comprises first pair of cylindrical lenses 60, Dove prism pair 70, 80, but not a second pair of cylindrical lenses. In this case, Dove prism 70 is connected to a random-phase generator.

After passing though lens pair 60, prism 70 and prism 80, the signal passes along fibre 130' to the other person, Alice. Alice has another geometric-phase adding portion 40''', with a pair of Dove prisms 70'', 80''. Prism 70'' is connected to a modulator for modulating the data to be encrypted.

After passing through Alice's prisms 70'', 80'', the signal passes back to Bob, along second fibre 130''.

On reaching Bob, the signal passes into another geometric-phase adding portion 40'', made up this time of two Dove prisms 70', 80' and cylindrical lens pair 90', but no first cylindrical lens pair; i.e., this portion corresponds to the geometric-phase-adding portion of the arrangement of FIG. 11. However, Dove prism 80' is connected to the random-phase generator via a feedback control unit, which also receives a signal from the decrypted-data output from the CCD array.

The light emerging from the geometric-phase-adding portion passes to portion 50' for detecting the added geometric phase, using a CCD array, as in earlier embodiments.

Figure 12:
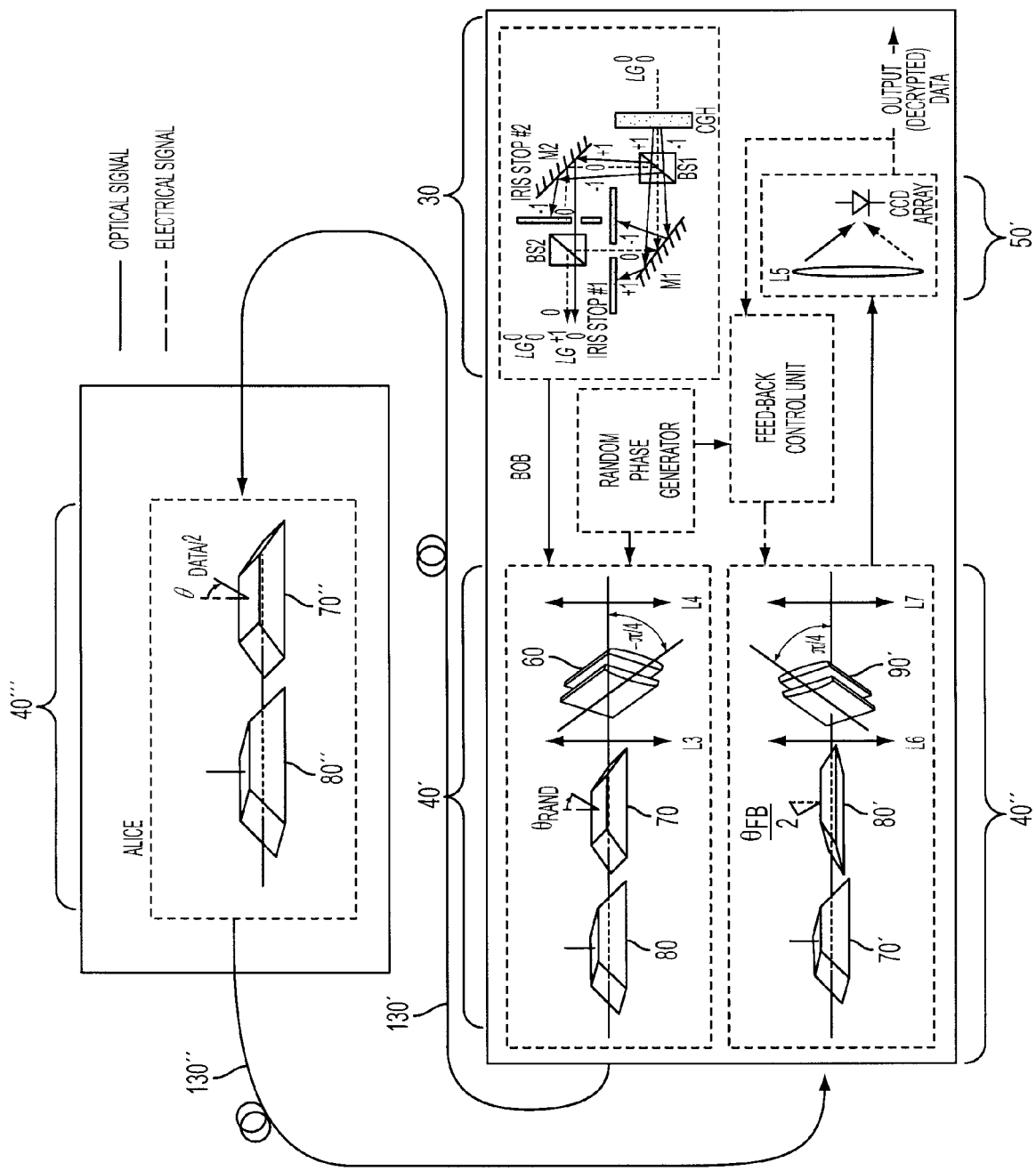
FIG. 12 is an encryption device according to a sixth example embodiment of the invention.

A protocol for secure data communication is accomplished as follows with the apparatus of FIG. 12.

1) Bob is the original source of the reference $LG_0^0$ mode and $LG_0^{+1}$ mode, and transmits them both along the fibre 130' to Alice at A. However, Bob additionally adds a random (or a data-like, e.g. binary phase, 0 or n bit stream) differential phase $\theta_{rand}$ between the $LG_0^0$ and $LG_0^{+1}$ modes using the Dove prism 70.

2) When the light signals of the two modes reach Alice at A, she sends them back to Bob again down a parallel optical fibre 130''.

3) Bob receives the reflected signal from Alice and, due to the random fibre perturbations discussed earlier, there are additional phase differences between the $LG_0^0$ and $LG_0^{+1}$ modes, over and above the random phase differences that Bob originally imposed. Using a suitable feedback system (which also has as a feed-forward input of a stream of random phase differences that Bob earlier imposed) Bob automatically adjusts the Dove prism 80' at the receiving end by a further phase $\theta_{FB}/2$ to dynamically change the geometric phase associated with the $LG_0^{+1}$ mode, to compensate for the combination of both the random phase stream he imposed and the accumulated path-dependent phase differences between the $LG_0^0$ and $LG_0^{+1}$ modes, so as to balance and equalize the phase between the two modes. In this case, the cylindrical lens pair 90' is also rotated by an angle $\pi/4+\theta_{FB}$ as required. Phase equalization between the modes is straightforwardly checked and measured at the CCD detector 50', with an electrical feed-back signal sent to the Feed-Back Control Unit to provide suitable feedback for the additional phase angle $\theta_{FB}/2$ applied to the Dove prism 80' and cylinder lens pair 90'.

4) Alice can now start transmitting the data key to Bob by imposing an additional "data" differential (geometric) phase onto the $LG_0^{+1}$ mode using the Dove prism 70'' in her set-up and rotating it by the angle $\theta_{Data}/2$, prior to reflecting the two modes back to Bob.

5) Only Bob knows the original random differential phase $\theta_{rand}/2$ he imposed onto the $LG_0^{+1}$ mode, and also the light has to complete the full journey B-A-B with its random perturbations along the length for there be to be the correct balance/equalization between the path-dependent accumulated phase and the overall geometric phase due to the feedback. From the received phase difference between the two modes, Bob can therefore "subtract" his imposed random phase and the random phase due to the fibre path perturbations from the received differential signal phase, and hence successfully extract the "data" signal from Alice.

Time-multiplexing between the training of the system (i.e. balancing or equalization of the geometric and path-length-dependent phases) and transmission of data from Alice is possible. Also, wavelength-multiplexing may be used; for example, an additional pair of the $LG_0^0$ and $LG_0^{+1}$ modes, at a slightly different wavelength to the wavelength used for data transmission, may be used to train the system. In that case, the feedback data used to equalize out the geometric and path-length-dependent phases for the "training" wavelength is also applied to the wavelength used for data transmission, on the assumption that (provided the wavelengths are sufficiently close) both wavelength systems experience similar phase perturbations whilst travelling along the fibre.

If there is an eavesdropper (Eve) between Alice and Bob, then even if Eve has an identical receiver to that of Bob, when she diverts a proportion of the signal, the full B-A-B path will no longer be accomplished by that proportion of light, and there will be no balance between the geometric phase and the path-dependent fibre-perturbation phase. In which case, in addition to the random phases $\theta_{rand}/2$ imposed by Bob onto the signal, Eve is not in a position to be able to distinguish the "data" phases from all the other random phases. It should also be noted that the more perturbations that the two modes experience along the path B-A-B, then the better is the protection due to the accumulated phase noise, which will better mask both the "data" phase and the random phases imposed by Bob.

Figure 13:
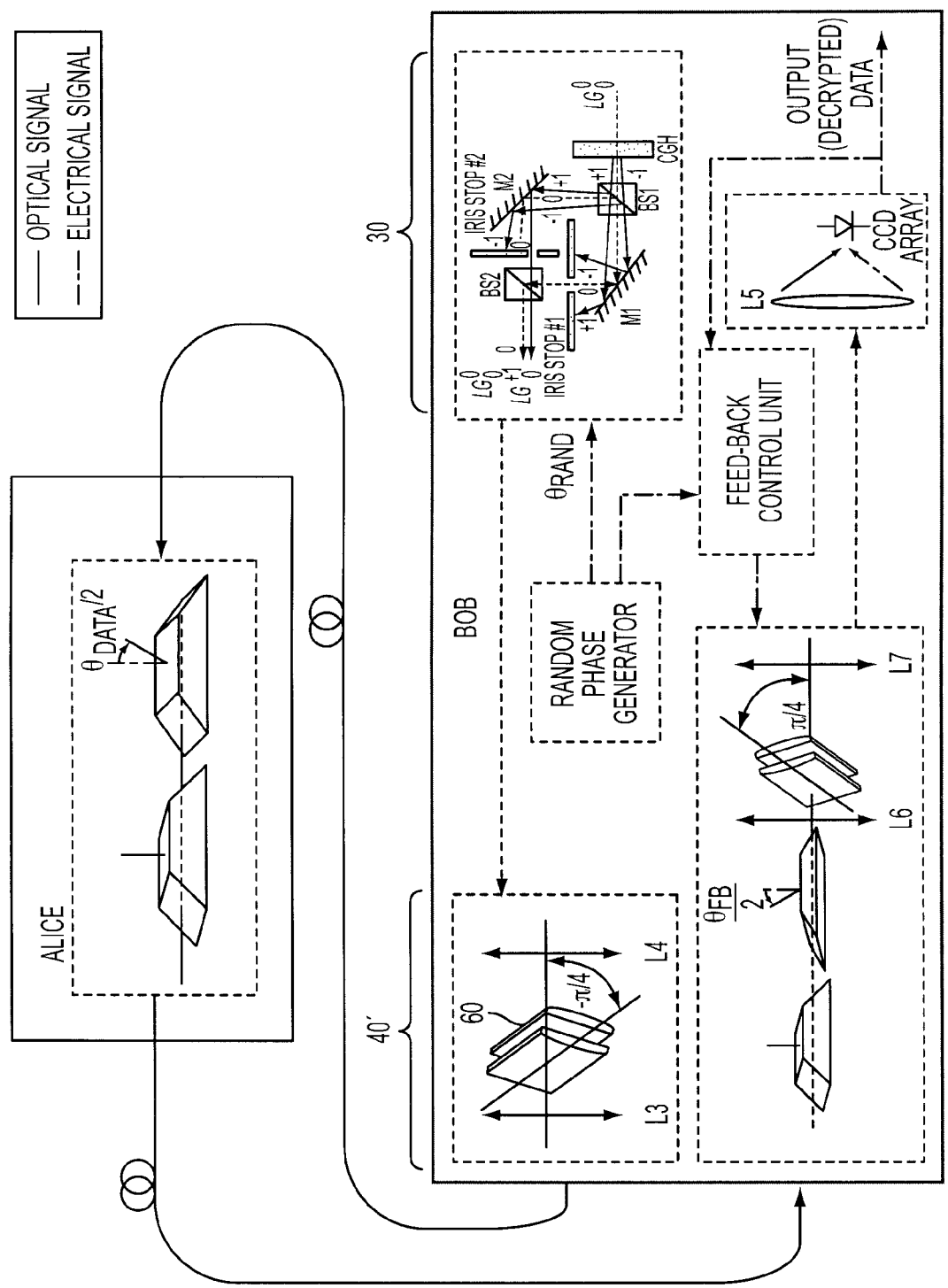
FIG. 13 is an encryption device according to a seventh example embodiment of the invention.

A seventh example embodiment (FIG. 13) is similar to the sixth embodiment, but Bob does not have Dove prisms 70, 80 in his transmitting geometric-phase-adding portion 40'; rather he has only one cylindrical lens pair 60. The random-phase generator (which is connected to a Dove prism in the sixth embodiment) is connected to one of the mirrors M1, M2 in orbital-angular-momentum generating portion 30. Bob adds the random differential phase onto the $LG_0^0$ mode or the $LG_0^{+1}$ mode by appropriate movement of either of the mirrors M1 or M2 respectively, in order to appropriately change the optical path length in one of the arms of the interferometer arrangement.

Figure 14:
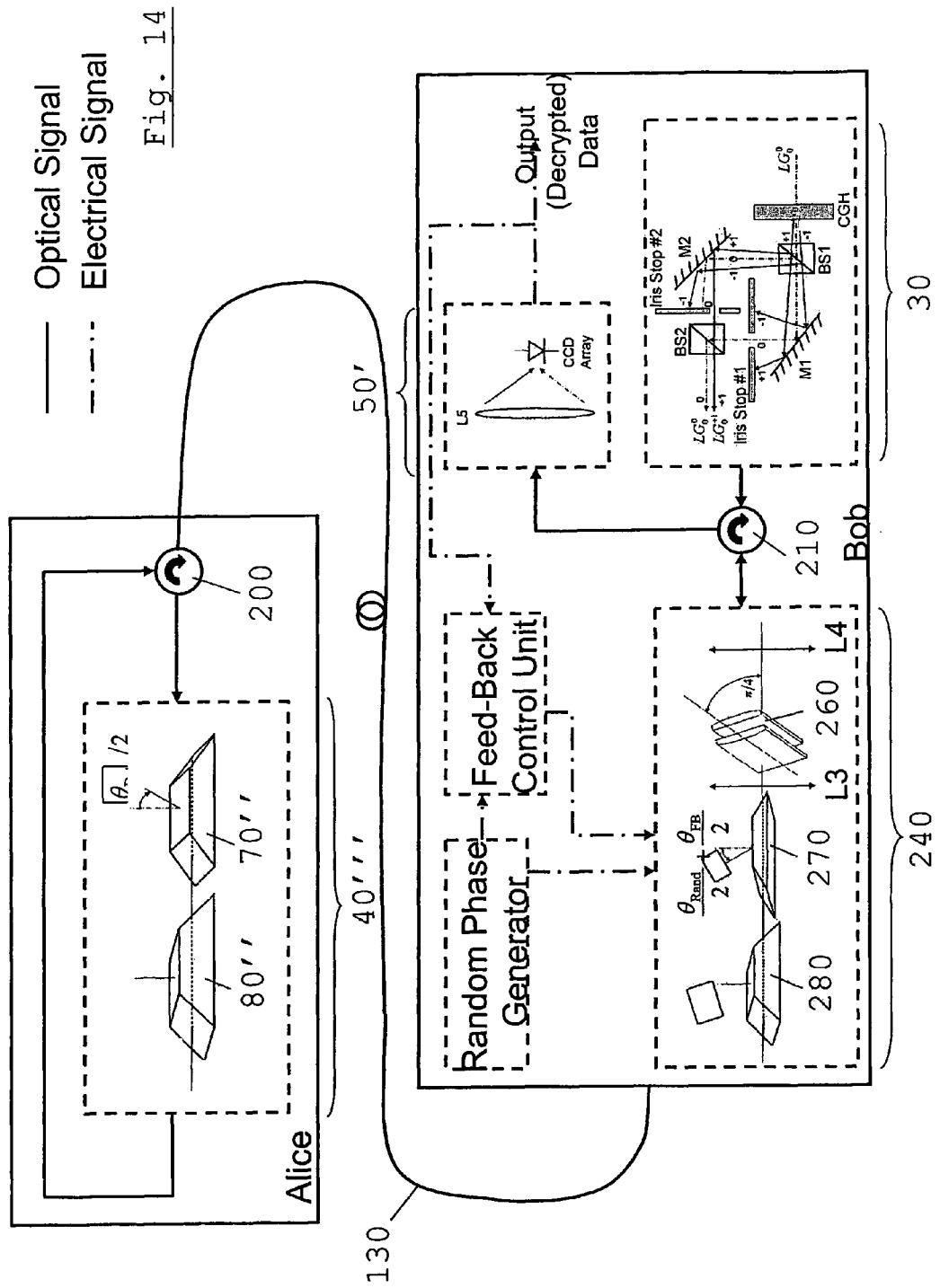
FIG. 14 is an encryption device according to an eight example embodiment of the invention.

In an eighth example embodiment (FIG. 14), a reflective arrangement is used, where Alice reflects the light via an optical circulator 200 back to Bob. In this arrangement, at Bob's end, light passes from an orbital-angular-momentum-generating portion 30 through an optical circulator 210 to geometric-phase-adding portion 240, which has one cylindrical lens pair 260, and a pair of Dove prisms 270, 280. Light passes from there along optical fibre 130 to Alice's apparatus, where it passes through optical circulator 200 and into geometric-phase-adding portion 40''', with a Dove prism pair 70'', 80'', as before. The light passes out of that prism pair, back into optical circulator 200, and back along fibre 130. Back at Bob's equipment, the light passes back through geometric-phase-adding portion 240, and back into optical circulator 210, from which it is diverted to the portion 50' for detecting the added geometric phase. The random-phase generator is connected to Dove prism 270 and also provides a signal to the feedback control unit, which also receives a signal from the decrypted-data output. The feedback control unit is also connected to Dove prism 270.

In other example embodiments, another degree of freedom (and hence of cryptographic complexity) is provided by varying the CGH used at both the transmitter and receiver ends. A spatial light modulator (SLM) is used to vary dynamically the CGH used to diffract the light. In some example embodiments, CGH's containing higher orbital angular momentum charges are used, to produce higher-order LG modes (i.e. $LG_0^{\pm m}$, where m signifies the degree of "charge" imparted by the CGH). Since the symmetries of the Poincaré sphere also work for such higher-order LG modes, and the combinations of parallel cylindrical lenses and Dove prisms can be similarly used to impart a geometric phase on the $LG_0^{\pm m}$ modes, this approach offers an additional means for "basis" encryption (see G. F. Calvo, "Wigner representation and geometric transformations of optical orbital angular momentum spatial modes", *Optics Letters*, 30(10), p 1207, 2005 for a discussion of higher-order orbital-angular-momentum modes). In one example, similar again to the BB84 algorithm, the CGH basis is varied randomly at the transmitter and receiver ends respectively. Only those measurements made when both CGHs are the same are valid, and are used to determine the information (i.e. the key) to be sent.

The example embodiments described above utilise what are essentially "free-space" implementations of the invention, utilising bulk optics. It will, however, be clear to the skilled person that many of the functions of the transmitter and receiver ends can be performed by equivalent devices, for example implemented in optical fibres or in an integrated optics device.

The skilled person will readily identify appropriate fibre to be used as the transmission fibre; thus in some embodiments of the invention, for example, the transmission fibre is "W"-fibre, designed for optimum transmission of higher-order LG modes; in other examples, it is for example photonic crystal fibre (PCF) optimised for equivalent doughnut modes. The two modes, $LG_0^{+1}$ and $LG_0^0$, can also be transmitted at different wavelengths, although at the receiver end, they will generally need to be converted to be the same wavelength as each other, for successful interference-based detection.

In other example embodiments, the modes of light are transmitted through free-space (rather than through guided-wave optics), since free-space transmission will also preserve the relative phase between the modes. The skilled person will readily understand from that that the techniques described here are also applicable to wireless transmission at microwave and RF frequencies.

Whilst the present invention has been described and illustrated with reference to particular embodiments, it will be appreciated by those of ordinary skill in the art that the invention lends itself to many different variations not specifically illustrated herein. Some examples of such variations and alternatives have been described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of encrypting data onto an electromagnetic beam, comprising: providing an electromagnetic beam having a signal component having a modal state, wherein the signal component is susceptible to accumulation of a geometric phase, and a reference component; transmitting the beam along a path over at least part of which the signal component accumulates a geometric phase by transformation of its modal state from a first modal state to a second modal state, from the second modal state to at least one further modal state, and then back to the first modal state; and modulating with the data the geometric phase so accumulated, by modulating the modal state transformations.

2. A method as claimed in claim 1, in which at least part of the geometric phase is accumulated at a transmitter.

3. A method as claimed in claim 1, in which at least part of the geometric phase is accumulated at a receiver.

4. A method as claimed in any preceding claim, in which the modulation occurs at a transmitter, but the modulated geometric phase only becomes measurable at a receiver.

5. A method as claimed in any preceding claim, in which the reference component of the light beam is not susceptible to accumulation of geometric phase.

6. A method as claimed in claim 5, in which the reference component is in a fundamental mode.

7. A method as claimed in any preceding claim, in which the modal states of the signal and reference components are orbital-angular-momentum modal states.

8. A method as claimed in claim 7, in which
the signal component begins as a Laguerre-Gaussian mode of order greater than or equal to 1, for example a $LG_0^{+1}$ mode, is transformed during the method into a Hermite-Gaussian mode, for example a $HG_{01}$, mode, a $HG_{10}$ mode, or a mixed state of $HG_{01}$, and $HG_{10}$ modes, and further transformed during the method from the Hermite-Gaussian mode to a Laguerre-Gaussian mode, for example from a $HG_{01}$ mode, a $HG_{10}$ mode, or a mixed state of $HG_{01}$ and $HG_{10}$ modes to a $LG_0^{+1}$ mode.

9. A method as claimed in claim 7, in which the reference component begins as a Laguerre-Gaussian mode, for example a $LG_0^0$ mode and remains as a $LG_0^0$ mode throughout the method.

10. A method as claimed in any of claim 7, in which the geometric phase is accumulated by passage though (i) a first pair of cylindrical lenses having parallel axes, (ii) at least one pair of Dove prisms, and (iii) a second pair of cylindrical lenses having parallel axes.

11. A method as claimed in claim 7, in which the modulation of the orbital angular momentum modal state is achieved using a modulator circuit arranged to drive an optical device in the path of the beam, so that the orbital angular momentum state of the signal component is modulated by movement of the device driven by the modulator.

12. A method of decrypting data from an electromagnetic beam, comprising: (i) receiving an electromagnetic beam having a signal component having a modal state, wherein the signal component is susceptible to accumulation of a geometric phase, and a reference component, the beam having been transmitted along a path over at least part of which the signal component accumulates a geometric phase by transformation of its modal state from a first modal state to a second modal state, from the second modal state to at least one further modal state, and then back to the first modal state, the accumulated geometric phase being modulated with the data by modulation of the modal state transformations, and (ii) comparing an overall phase of the signal component with an overall phase of the reference component so as to retrieve the modulation.

13. A method as claimed in claim 12, in which the modulation is retrieved by focusing the beam onto a detector and observing an interference pattern resulting from interference between the two components.

14. A method as claimed in claim 12, in which the accumulated geometric phase is removed by changing the orientation of optical elements in a manner complementary to orientation changes made to corresponding elements during an encryption phase.

15. A method as claimed in claim 12, in which the accumulated geometric phase is removed prior to decryption by passage though (i) a first pair of cylindrical lenses having parallel axes, (ii) a pair of Dove prisms, and (iii) a second pair of cylindrical lenses having parallel axes.

16. A method as claimed in claim 12, in which the signal and reference components are separated from other components by splitting the beam into two beams, spatial filtering each beam to select components, and recombining selected components to reform the beam.

17. Apparatus for encrypting data onto an electromagnetic beam, comprising:
a plurality of optical elements arranged to generate in the electromagnetic beam a signal component having a modal state, wherein the signal component is susceptible to accumulation of a geometric phase, and a reference component;
a plurality of optical elements arranged to transform the modal state of the signal component from a first modal state to a second modal state, from the second modal state to at least one further modal state, and then back to the first modal state; and
a modulator connected to at least one of the optical elements and arranged to modulate with the data the modal state of the signal component.

18. Apparatus as claimed in claim 17, in which the signal and/or reference component are generated using a 2D grating.

19. Apparatus as claimed in claim 17 including a beam-splitter arranged to separate the beam into two beams, filters to spatially filter each beam to select the components, and a beamsplitter to recombine the selected components to reform the beam.

20. Apparatus as claimed in claim 17, comprising a plurality of optical elements arranged to alter an orbital angular momentum state of the signal component, the elements comprising a pair of cylindrical lenses having parallel axes.

21. Apparatus as claimed in claim 20, further comprising a second pair of cylindrical lenses having parallel axes.

22. Apparatus as claimed in claim 17, comprising a plurality of optical elements arranged to alter an orbital angular momentum state of the signal component, the elements comprising a pair of Dove prisms, the prisms being arranged at an angle relative to each other.

23. Apparatus as claimed in claim 17, comprising a modulator circuit arranged to drive an optical element in the path of the beam, so that the modal state of the signal component of the beam is modulated by movement of the element driven by the modulator.

24. Apparatus as claimed in claim 17, comprising a random-phase generator, connected to an optical element within the apparatus, the element being arranged to impart a random modal state variation to the signal component or a random relative phase variation between the signal and reference components.

25. Apparatus as claimed in claim 17, including apparatus for decrypting the data from the beam.

26. Apparatus for decrypting data from an electromagnetic beam, comprising:
apparatus for receiving an electromagnetic beam having a signal component having a modal state, wherein the signal component is susceptible to accumulation of a geometric phase, and a reference component, the beam having been transmitted along a path over at least part of which the signal component accumulates a geometric phase by transformation of its modal state from a first modal state to a second modal state, from the second modal state to at least one further modal state, and then back to the first modal state, the accumulated geometric phase having been modulated with the data;
a plurality of optical elements arranged to alter the modal state of the signal component; and
a demodulator arranged to compare an overall phase of the signal component with an overall phase of the reference component, so as to retrieve the modulation.

27. Apparatus as claimed in claim 26, in which the decrypting apparatus is connected to the encrypting apparatus by an optical fibre.

28. Apparatus as claimed in claim 26, in which the decrypting apparatus comprises a detector arranged to detect an interference pattern resulting from interference between orbital-angular-momentum modes emerging from fibre.

29. Apparatus as claimed in claim 28, in which the decrypting apparatus further comprises a second pair of cylindrical lenses having parallel axes.

30. Apparatus as claimed in claim 26, in which the signal component is degenerated using a 2D grating.

31. Apparatus as claimed in claim 26, in which the decrypting apparatus comprises a plurality of optical elements arranged to alter an orbital angular momentum state of the signal component, the elements comprising a pair of cylindrical lens having parallel axes.

32. Apparatus as claimed in claim 26, in which the decrypting apparatus comprises a plurality of optical elements arranged to alter an orbital angular momentum state of the signal component, the elements comprising a pair of Dove prisms, the prisms being arranged at an angle relative to each other.

33. Apparatus as claimed in claim 26, in which the decrypting apparatus comprises a modulator circuit arranged to drive an optical element in the path of the beam, so that the orbital-angular-momentum state of the signal component is modulated by movement of the element driven by the modulator.

34. Apparatus as claimed in claim 26, in which the decrypting apparatus comprises a plurality of optical components arranged to combine the signal component and the reference component into a single mode.

35. Apparatus as claimed in claim 26, in which the decrypting apparatus includes a feedback loop, which receives input from a detector of the decrypted data and a random phase generator, and which is connected to an optical element within the decrypting apparatus, the element being arranged to cancel a random orbital-angular-momentum state variation from the signal component or a random relative phase variation between the signal and reference components.

36. A method of decrypting data from an electromagnetic beam, comprising: (i) receiving an electromagnetic beam having a first orbital-angular-momentum mode and a second orbital-angular momentum mode, the beam having been transmitted along a path over at least part of which at least one of the orbital angular momentum modes accumulates a geometric phase, the geometric phase of the first orbital-angular-momentum mode having been modulated by the data, and (ii) comparing the overall phase of the first orbital-angular-momentum mode with the overall phase of the second orbital-angular-momentum mode so as to retrieve the geometric phase modulation.

37. A method of communicating encrypted data, comprising:
(1) generating a beam including a first orbital-angular-momentum component and a second orbital-angular-momentum component;
(2) adding to the beam a random or data-like differential phase between orbital-angular-momentum components;
(3) transmitting the beam to a person who is to encrypt the data;
(4) receiving the beam back from the person;
(5) compensating for the combination of both the added differential phase and any path-dependent phase differences accumulated between steps (3) and (4), so as to balance and equalize the phase between the two modes;
(6) further receiving the beam from the person, the beam now including data encrypted on the beam by the person as an additional data differential (geometric) phase between the orbital-angular-momentum components;
(7) repeating the compensation of step (5) and hence extracting the data as a residual phase difference between the orbital-angular-momentum components.

* * * * *

UNITED STATES PATENT AND TRADEMARK OFFICE
CERTIFICATE OF CORRECTION

PATENT NO. : 8,184,972 B2
APPLICATION NO. : 12/219630
DATED : May 22, 2012
INVENTOR(S) : Michael Charles Parker et al.

It is certified that error appears in the above-identified patent and that said Letters Patent is hereby corrected as shown below:

Column 17, Line 10, In Claim 8, delete "HG01," and insert -- HG01 --, therefor.
Column 17, Line 11, In Claim 8, delete "HG01," and insert -- HG01 --, therefor.
Column 17, Line 14, In Claim 8, delete "HG10mode," and insert -- HG10 mode, --, therefor.
Column 17, Line 15, In Claim 8, delete "HG10modes" and insert -- HG10 modes --, therefor.
Column 17, Line 20, In Claim 10, after "claimed in" delete "any of".
Column 20, Line 4, In Claim 36, delete "orbital-angular momentum" and insert
-- orbital-angular-momentum --, therefor.
Column 20, Line 6, In Claim 36, delete "orbital angular momentum" and insert
-- orbital-angular-momentum --, therefor.

Signed and Sealed this
Twenty-seventh Day of November, 2012

David J. Kappos
*Director of the United States Patent and Trademark Office*